United States Patent
Kotov

(10) Patent No.: US 12,517,250 B2
(45) Date of Patent: Jan. 6, 2026

(54) MULTIDIMENSIONAL MATERIALS SENSING SYSTEMS AND METHODS

(71) Applicant: THE REGENTS OF THE UNIVERSITY OF MICHIGAN, Ann Arbor, MI (US)

(72) Inventor: Nicholas A. Kotov, Ypsilanti, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1116 days.

(21) Appl. No.: 17/604,240

(22) PCT Filed: Apr. 17, 2020

(86) PCT No.: PCT/US2020/028775
§ 371 (c)(1),
(2) Date: Oct. 15, 2021

(87) PCT Pub. No.: WO2020/214959
PCT Pub. Date: Oct. 22, 2020

(65) Prior Publication Data
US 2022/0206154 A1    Jun. 30, 2022

Related U.S. Application Data

(60) Provisional application No. 62/835,256, filed on Apr. 17, 2019.

(51) Int. Cl.
*G01S 17/89* (2020.01)
*A61B 5/00* (2006.01)
(Continued)

(52) U.S. Cl.
CPC .......... *G01S 17/89* (2013.01); *A61B 5/0059* (2013.01); *A61B 5/7267* (2013.01); *B07C 5/10* (2013.01);
(Continued)

(58) Field of Classification Search
CPC ...... G01S 17/89; G01S 7/4814; G01S 7/4865; A61B 5/0059; B07C 5/10; G06V 10/44; G06V 20/64
See application file for complete search history.

(56) References Cited

U.S. PATENT DOCUMENTS 5,988,862 A    11/1999  Kacyra et al.
9,234,618 B1    1/2016  Zhu et al.
(Continued)

FOREIGN PATENT DOCUMENTS

CN    107607040 A    1/2018
CN    107632310 A    1/2018
(Continued)

OTHER PUBLICATIONS

Baek, Seung-Hwan et al. "Simultaneous Acquisition of Polarimetric SVBRDF and Normals." ACM transactions on graphics 37.6 (2018). Web. (Year: 2018).*
(Continued)

*Primary Examiner* — John R Wallace
(74) *Attorney, Agent, or Firm* — Harness, Dickey & Pierce, P.L.C.

(57) ABSTRACT

Multidimensional Light Imaging, Detection, and Ranging (LIDAR) systems and methods optionally include a laser device configured to generate a plurality of light pulses emitted towards an object, a detector configured to receive a portion of the plurality of light pulses returned from the object, and a processor configured to generate a point cloud representing the object based on the plurality of light pulses received by the detector, the point cloud having a plurality of points, each point having a three-dimensional positional coordinate representing a location of the point on the object and having at least one additional value representing at least one of material information indicating a material of the object at the location of the point on the object or optical (Continued)

information indicating at least one optical characteristic of the plurality of light pulses returned from the surface of the object from the location of the point on the object.

9 Claims, 20 Drawing Sheets

(51) Int. Cl.
  *B07C 5/10* (2006.01)
  *G01S 7/481* (2006.01)
  *G01S 7/4865* (2020.01)
  *G06V 10/44* (2022.01)
  *G06V 20/64* (2022.01)

(52) U.S. Cl.
  CPC .......... *G01S 7/4814* (2013.01); *G01S 7/4865* (2013.01); *G06V 10/44* (2022.01); *G06V 20/64* (2022.01)

(56) References Cited

U.S. PATENT DOCUMENTS

| | | |
|---|---|---|
| 2003/0034281 A1 | 2/2003 | Kumar |
| 2005/0099637 A1 | 5/2005 | Kacyra et al. |
| 2008/0074640 A1 | 3/2008 | Walsh et al. |
| 2010/0106356 A1 | 4/2010 | Trepagnier et al. |
| 2010/0280765 A1 | 11/2010 | Marquardt et al. |
| 2015/0062555 A1 | 3/2015 | Kim |
| 2015/0375269 A1 | 12/2015 | Adams et al. |
| 2016/0299270 A1 | 10/2016 | Kotov et al. |
| 2017/0132458 A1 | 5/2017 | Short et al. |
| 2018/0239021 A1 | 8/2018 | Akselrod et al. |
| 2020/0025618 A1 | 1/2020 | Kotov et al. |
| 2020/0331034 A1* | 10/2020 | Balthasar .......... G01B 11/2522 |

FOREIGN PATENT DOCUMENTS

| | | |
|---|---|---|
| CN | 105107760 B | 2/2018 |
| CN | 107851176 A | 3/2018 |
| EP | 1533607 A2 | 5/2005 |
| EP | 2646174 B1 | 10/2017 |
| JP | 2010256138 A | 11/2010 |
| JP | 201224252 A | 2/2012 |
| JP | 2012187358 A | 10/2012 |
| JP | 2018151277 A | 9/2018 |
| WO | WO-2018127789 A1 | 7/2018 |
| WO | WO-2018129201 A1 | 7/2018 |
| WO | WO-2018184913 A1 | 10/2018 |
| WO | WO-2019025035 A1 | 2/2019 |
| WO | WO-2019139656 A1 | 7/2019 |

OTHER PUBLICATIONS

Second Office Action regarding Chinese Patent Application No. 202080044109.9, dated Feb. 8, 2025.
Second Office Action issued on Oct. 2, 2024, for JP Application No. 2021561860; 4 pages.
W.J. Choi, et al., "Chiroptical Kirigami Modulators for Terahertz Circular Dichroism Spectroscopy Biomaterials," Nature Materials, 18, 820-826 (2019).
Kotov, N.A. et al., "Ultrathin graphite oxide-polyelectrolyte composites prepared by self-assembly: Transition between conductive and non-conductive states," Adv. Mater., 8, 637-641 (1996).
Kotov, N.A. et al., "Layer-by-Layer Self-assembly of Polyelectrolyte-Semiconductor Nanoparticle Composite Films," J. Phys. Chem., 99, 13065-13069 (1995).
Jing Lyu, et al., "Stretchable conductors by kirigami patterning of aramid-silver nanocomposites with zero conductance gradient," Appl. Phys. Lett., 111, 161901 (2017).
Lizhi Xu, et al., "Origami and Kirigami Nanocomposites," ACS Nano, 11(8) 7587-7599 (2017).
Cornell S.L. Chun et al., "Polarimetric laser radar target classification," Optics Letters, Jul. 15, 2005,vol. 30, No. 14,pp. 1806-1808,DOI: 10.1364/OL.30.001806.
First Office Action issued Feb. 16, 2024, for JP Application No. 2021-561860; 9 pages.
First Office Action issued Jun. 1, 2024, for Chinese Patent Application No. 202080044109.9.
Ruichao Song et al.; "Research on Non-Contact Measurement Technology of Stereo Vision Based on Polarization Information"; Chinese Master's Theses Full-text Database (Basic Sciences); Dec. 15, 2018; pp. 1138-1432.
International Search Report and Written Opinion of the International Searching Authority issued in PCT/US2020/028775, mailed on Jul. 21, 2020; ISA/US.
Xu et al.,"Kirigami Nanocomposites as Wide-Angle Diffraction Gratings," *ACS Nano*, 10 (6), 6156-6162 (2016).
Wikipeda: "Optical sorting: Difference between revisions"; Mar. 16, 2019; pp. 1-7; XP55978826; retrieved from the Internet: URL: ht_tps: //en. wikipedia. org/w/ index. php?titl.e=Optical._sorting &diff=888003659&ol.did=864650588 (retrieved on Nov. 8, 2022].
Desta Feven, et al.; "Evaluation of sensor technologies for on-line raw material characterization in "Reiche Zeche" underground mine-outcomes of RTM implementation"; 2019 Real Time Mining—Conference on Innovation on Raw Material; Mar. 26, 2019; pp. 26-27, XP055810331; retrieved from the Internet: URL:https://pure.tudelft.nl/ws/portalfiles/portal/67353282/Evaluation.pdf (retrieved on Jun. 3, 2021).
Extended European Search Report for European Application No. 20791445.8 issued Nov. 24, 2022; 16 pages.
Office Action regarding Korean Patent Application No. 10-2021-7035880, dated Jul. 14, 2025. Translation provided by Yuil Highest International Patent & Law Firm.

* cited by examiner

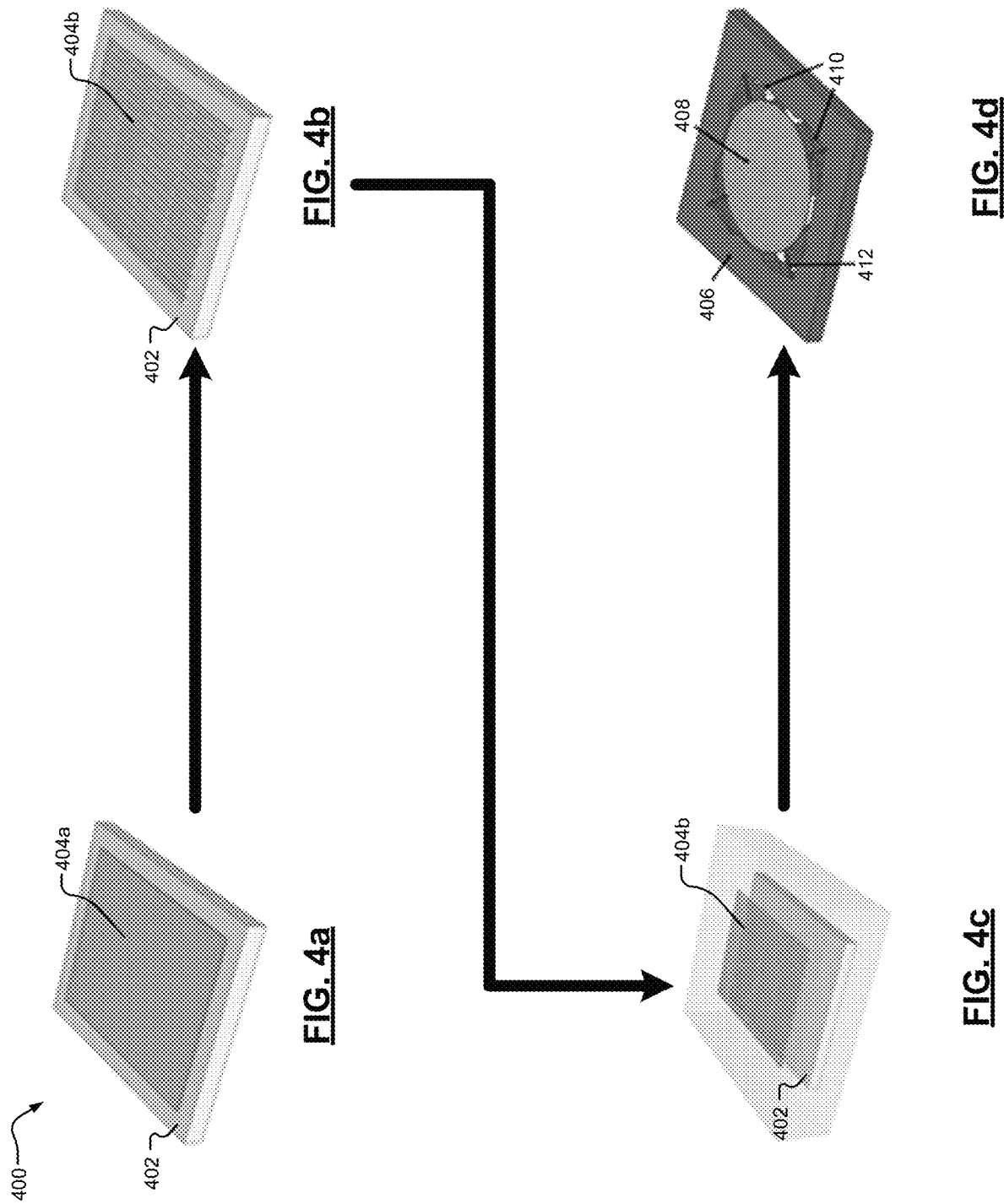

2000

2000

MULTIDIMENSIONAL MATERIALS SENSING SYSTEMS AND METHODS

CROSS-REFERENCE TO RELATED APPLICATION

This application is a 371 U.S. National Phase of International Application No. PCT/US2020/028775, filed on Apr. 17, 2020, which claims the benefit of U.S. Provisional Application No. 62/835,256, filed on Apr. 17, 2019. The entire disclosures of the above applications are incorporated herein by reference.

FIELD

The present disclosure relates to materials sensing systems and methods and, more particularly, to multidimensional materials-sensing systems and methods for making and using the same.

BACKGROUND

This section provides background information related to the present disclosure which is not necessarily prior art.

LIDAR is a surveying method that measures distance to an object by illuminating the object with a pulsed laser light, and measuring the reflected pulses with a sensor. Differences in laser return times and wavelengths can then be used to make digital 3D-representations of the detected object. LIDAR may be used to produce high-resolution maps, with applications in geodesy, geomatics, archaeology, geography, geology, geomorphology, seismology, forestry, atmospheric physics, laser guidance, airborne laser swath mapping (ALSM), and laser altimetry. LIDAR technology may also be used for the control and navigation of autonomous cars.

A conventional LIDAR device may operate as follows. A laser source produces a pulse of polarized or unpolarized light at a specific wavelength. When the light is first emitted, a time-of-flight sensor records the initial time. The time-of-flight is used to determine the total distance the light travels from source to detector by using the speed at which light travels.

The emitted light is then "steered" in a given angle. This "steering" can also include the splitting of a light pulse into multiple pulse components aimed at various angles. The steering angle(s) will change over time in order to obtain a specific field of view for a comprehensive mapping of the environment. After it has been aimed, the light may pass through linear polarization optics before and after the emission. These types of LIDARs are known as polarization LIDARs, and may use polarization optics at a registration step.

Conventional LIDAR devices typically employ optical lenses that are bulky and expensive. Moreover, the optical lenses utilized in conventional LIDAR devices require extensive protective packaging due to their sensitivity to moisture, which increases the weight, size, and complexity of the LIDAR devices in which they are employed. One well-known problem with implementation of LIDAR systems with rotational optics (e.g., the Velodyne-HDL64™ model) in autonomous vehicles and robots is their large size and high cost. The rotation of the entire device to steer laser beams reduces reliability, restricts miniaturization, and increases energy consumption. LIDAR systems based on solid-state beam steering address this problem, but their implementation is impeded by insufficient accuracy and range. Another issue is the performance of LIDARs and all the other sensors in inclement weather. Currently utilized laser beams with wavelengths around 900-940 nm can be strongly scattered by rain, fog, and snow, so that their read-outs can become highly uncertain under such conditions.

In addition, conventional LIDAR devices and their appurtenant analysis systems have proven limited in their ability to accurately to perform object recognition. For example, LIDAR point clouds are known to be based solely on a distance read-out from the laser source to the object. In this representation of the human world, a person resting on a bench and a statue of the same are identical. The problem is also true for a sleeping baby and a similarly sized plastic doll lying next to it, or when attempting to distinguish a black car in the distance from the pavement. The burden of distinguishing these objects and deciphering the surroundings is carried by the computational processing of these 3D maps.

Adequate classification of objects based on their geometries is not a trivial problem, requiring complex algorithms and large computational power, especially considering the highly dynamic nature of various environments. Furthermore, typical LIDAR hardware makes adequate object recognition and classification even more difficult because the current beam steering methods cause clustering and banding of points in LIDAR clouds, which results in ambiguous interpretation of 3D images and their individual points. Consequently, the geometry-based perception of surroundings demands high computational costs, large energy consumption, and long processing times.

Accordingly, improved LIDAR systems and methods are desired, especially LIDAR systems and methods providing an ability to identify the material from which an object is formed.

SUMMARY

This section provides a general summary of the disclosure, and is not a comprehensive disclosure of its full scope or all of its features.

In certain aspects, the present disclosure provides a system comprising a laser device configured to generate a plurality of light pulses emitted towards an object, a detector configured to receive a portion of the plurality of light pulses returned from the object, and a processor configured to generate a point cloud representing the object based on the plurality of light pulses received by the detector, the point cloud having a plurality of points, each point having a three-dimensional positional coordinate representing a location of the point on the object and having at least one additional value representing at least one of material information indicating a material of the object at the location of the point on the object or optical information indicating at least one optical characteristic of the plurality of light pulses returned from the surface of the object from the location of the point on the object.

In one aspect, the optical information includes at least one of polarization information, Raman scattering information, and circular dichroism information.

In one aspect, the at least one additional value represents the material information indicating the material on a surface of the object at the location of the point and the processor is configured to generate the material information based on the optical information indicating at least one optical characteristic of the reflection of the plurality of reflections returned from the surface of the object at the location of the point.

In a further aspect, the processor is configured to generate the material information based on at least one of polarization information, Raman scattering information, and circular dichroism information of the reflection returned from the surface of the object at the location of the point.

In one aspect, the object is one of a plurality of objects and the system further comprises a conveyor belt configured to transport the plurality of objects past the laser device and a sorter that sorts the plurality of objects into a plurality of containers wherein the at least one additional value represents the material information indicating the material of a surface of the object at the location of the point and the processor is configured to control the sorter to sort the object into a one of the plurality of containers based on the material information.

In one aspect, the system further comprises at least one additional laser device configured to generate a plurality of additional light pulses emitted towards the object, the at least one additional laser device being located at a different location from the laser device and at least one additional detector configured to receive a portion of the plurality of additional light pulses returned from the object, the at least one additional detector being located at a different location from the detector, wherein the processor is configured to generate the point cloud representing the object additionally based on the plurality of additional light pulses received by the at least one additional detector.

In other variations, the present disclosure provides a method comprising initializing, with at least one processor, parameters of a neural network based on physical laws of light/matter interaction, emitting, with a laser device, a plurality of light pulses towards an object having a predetermined material composition, receiving, with a detector, a plurality of reflections of the plurality of light pulses returned from the object, inputting, with the processor, optical characteristics of the plurality of reflections into the neural network, receiving, with the processor, an expected material composition of the object from the neural network based on the inputted optical characteristics, comparing, with the processor, the expected material composition with the predetermined material composition, and adjusting, with the processor, the parameters of the neural network based on the comparison.

In one aspect, the adjusting the parameters is performed using a machine learning algorithm.

In one aspect, the method further comprises repeatedly adjusting the parameters of the neural network based on comparisons additional expected material compositions for additional objects with additional known material compositions of the additional objects until a difference between one of the expected material compositions and a corresponding one of the additional known material compositions is less than a predetermined margin of error, the additional expected material compositions being generated by inputting optical characteristics for a plurality of additional reflections of a plurality of additional light pulses reflected off of the additional objects by the laser device.

In other variations, the present disclosure provides another system comprising a polarimetric camera configured to receive ambient light reflected off of a surface of an object and to generate image data associated with the object and polarization data associated with the ambient light reflected off of the surface of the object. The system further comprises a processor configured to generate a point cloud representing the object based on the image data and the polarization data, the point cloud having a plurality of points, each point having a three-dimensional positional coordinate representing a location of the point on the object and material information indicating a material of the object at the location of the point on the object. The processor is further configured to determine the material information based on a polarization of the ambient light reflected off of the object from the location of the point on the object.

In one aspect, the processor is further configured to access a materials database that stores correlation information between ambient light polarization and object materials and determines the material information indicating the material of the object at the location of each point on the object based on the materials database and based on the polarization of the ambient light reflected off of the object from the location of each point on the object.

In one aspect, the processor is further configured to determine a plurality of materials that comprise the object based on the material information indicating the material of the object at the location of each point on the object and to perform at least one of classifying or identifying the object based on the plurality of materials that comprise the object.

In a further aspect, the processor is further configured to access an object database that stores correlation information between a plurality of objects and materials that comprise each object of the plurality of objects and to perform the at least one of classifying or identifying the objects based on the correlation information stored in the object database and the plurality of materials that comprise the object.

In one aspect, the processor is further configured to determine an edge within the image data between the object and an additional object detected by the polarimetric camera based on a difference between the polarization data associated with the ambient light reflected off of the surface of the object and additional polarization data associated with the ambient light reflected off of a surface of the additional object.

In one aspect, the additional light source can be utilized to image the object with polarization camera. This light source can be the laser of a LIDAR being utilized in the same perception system.

In one aspect the materials identification from images obtained by the polarization camera can be attained by using time- and distance progressions of the images because polarization signature of materials varies with the reflected and scattering angle of light off the object. AI/ML analysis of the time- and distance dependencies of the polarization images results in increased accuracy of the materials and object identification.

In one aspect, the object is one of a plurality of objects and the system further comprises a conveyor belt configured to transport the plurality of objects past the polarimetric camera and a sorter that sorts the plurality of objects into a plurality of containers. The processor is configured to control the sorter to sort the object into a one of the plurality of containers based on the material information.

In one aspect, the system further comprises at least one additional polarimetric camera located at a different location from the polarimetric camera and configured to generate additional image data and additional polarization data associated with the object and the processor is further configured to generate the point cloud representing the object additionally based on the additional image data and additional polarization data generated by the at least one additional polarimetric camera.

In other variations, the present disclosure provides another method comprising initializing, with at least one processor, parameters of a neural network based on physical laws of light/matter interaction and receiving, with a polarimetric camera, a plurality of reflections of ambient light reflected off of the object. The method further comprises determining, with the processor, polarization information for the plurality of reflections of ambient light reflected off of the object, inputting, with the processor, the polarization information for the plurality of reflections into the neural network, and receiving, with the processor, an expected material composition of the object from the neural network based on the inputted polarization information. The method further comprises comparing, with the processor, the expected material composition with the predetermined material composition and adjusting, with the processor, the parameters of the neural network based on the comparison.

In one aspect, the adjusting the parameters is performed using a machine learning algorithm and/or an artificial intelligence algorithm.

In one aspect, the method further comprises repeatedly adjusting the parameters of the neural network based on comparisons of additional expected material compositions for additional objects with additional known material compositions of the additional objects until a difference between one of the expected material compositions and a corresponding one of the additional known material compositions is less than a predetermined margin of error, the additional expected material compositions being generated by inputting additional polarization information for a plurality of additional reflections of ambient light reflected off of the additional objects and received by the polarimetric camera.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4a-4d illustrate a representative simplified process for manufacturing nano-kirigami-based optical elements according to certain aspects of the present disclosure;

Figure 5C:
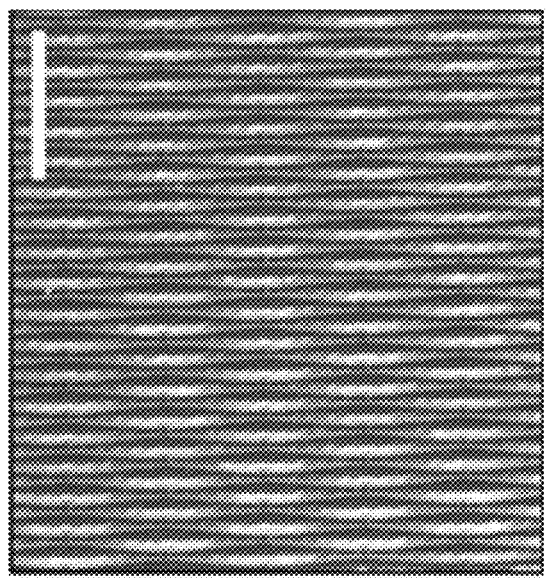
Figure 5B:
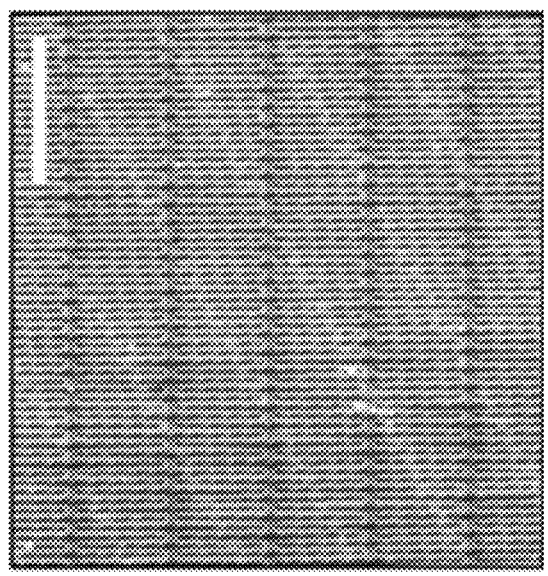
Figure 5A:
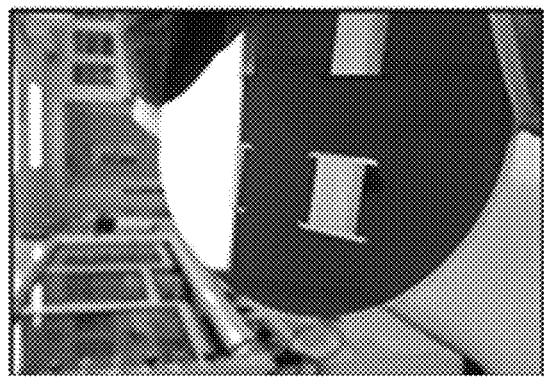
Figure 6:
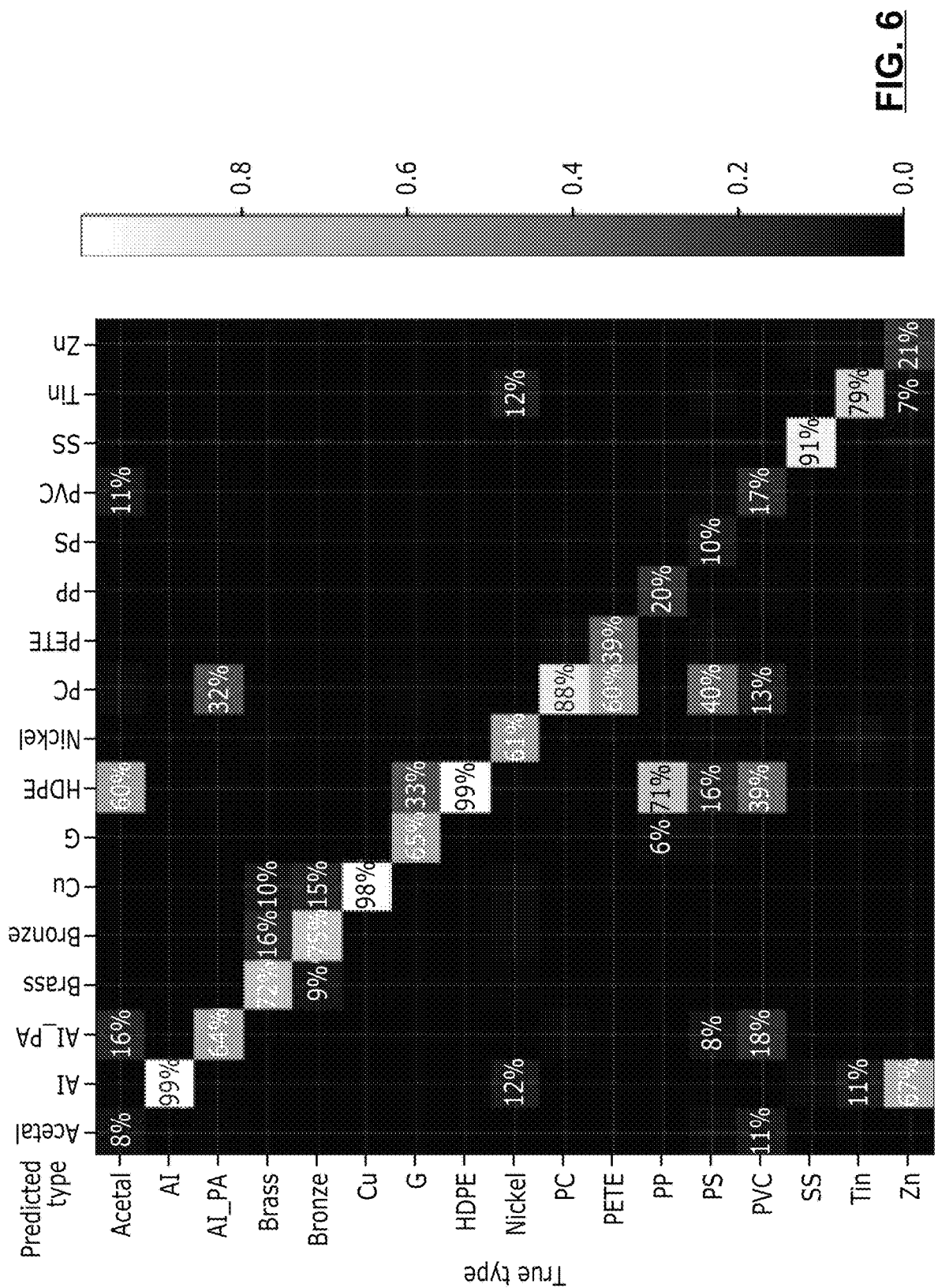
Figure 7:
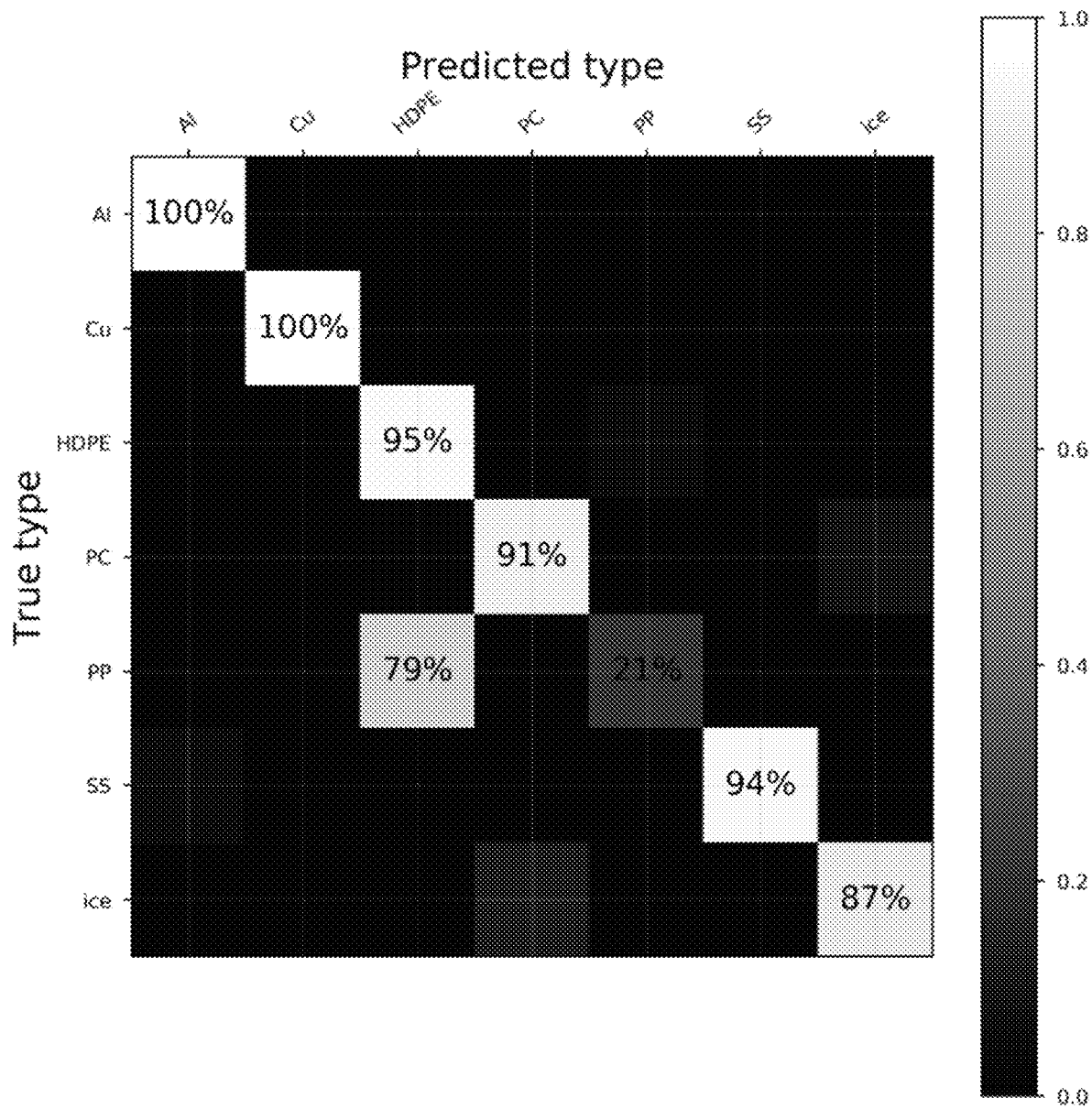
Figure 8:
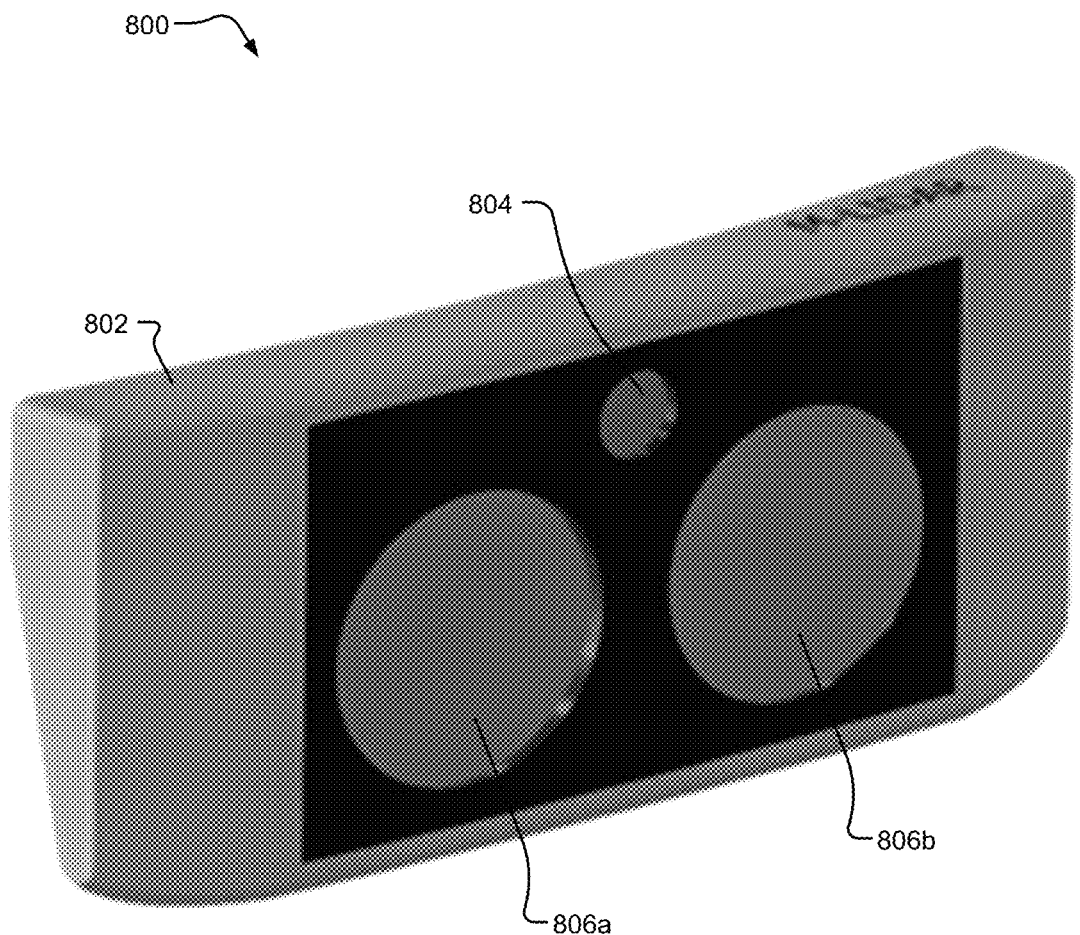
Figure 9:
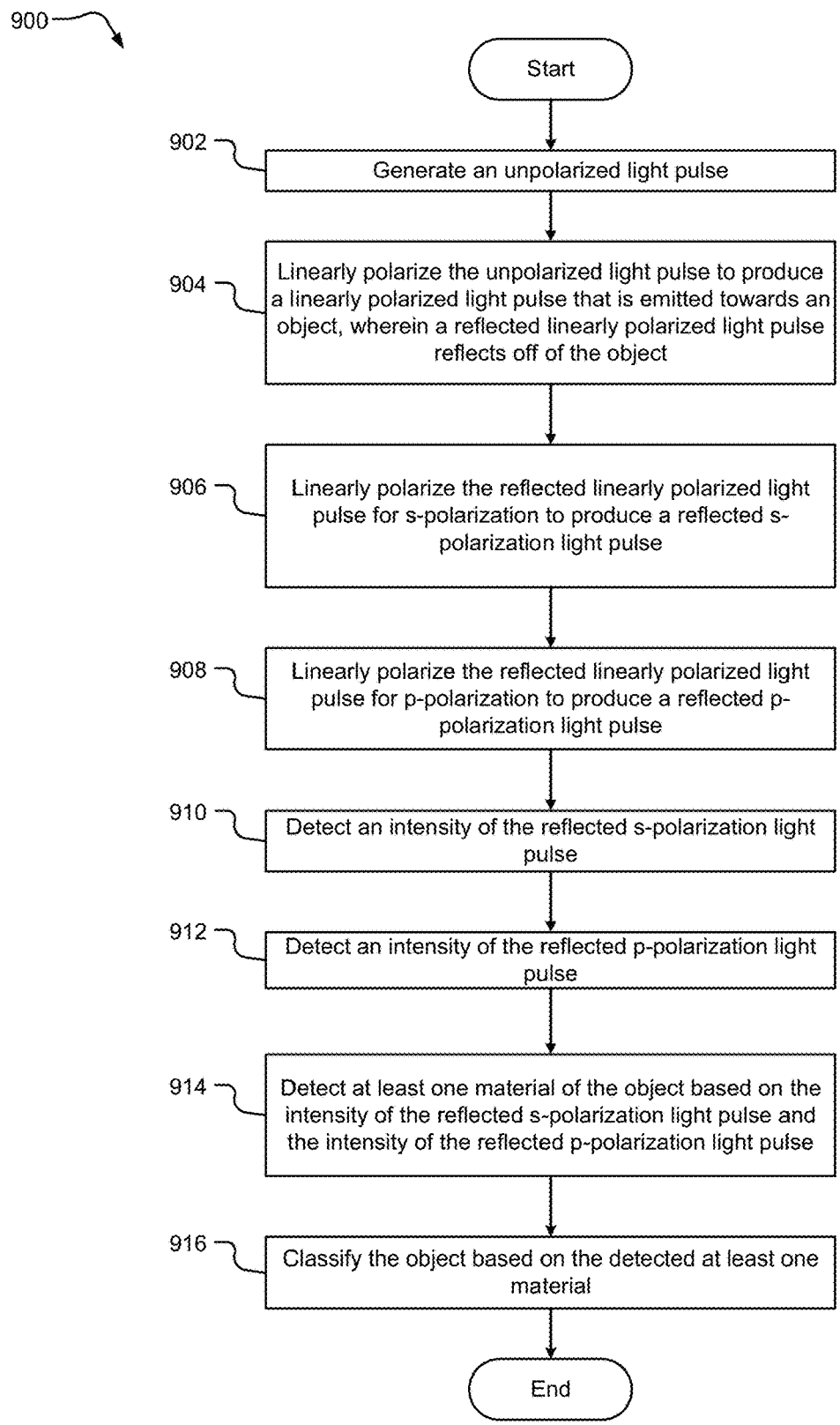
Figure 10:
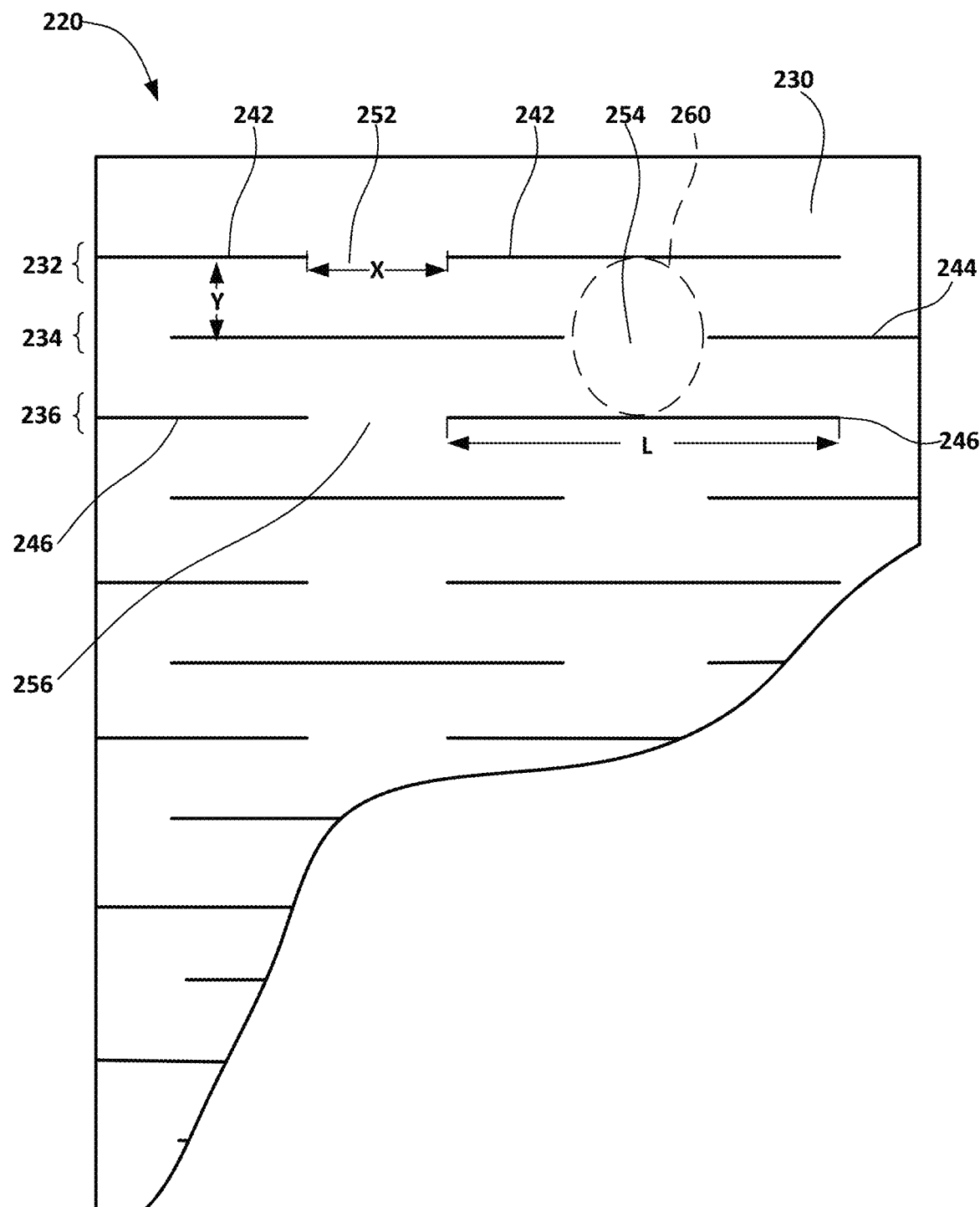
Figure 11:
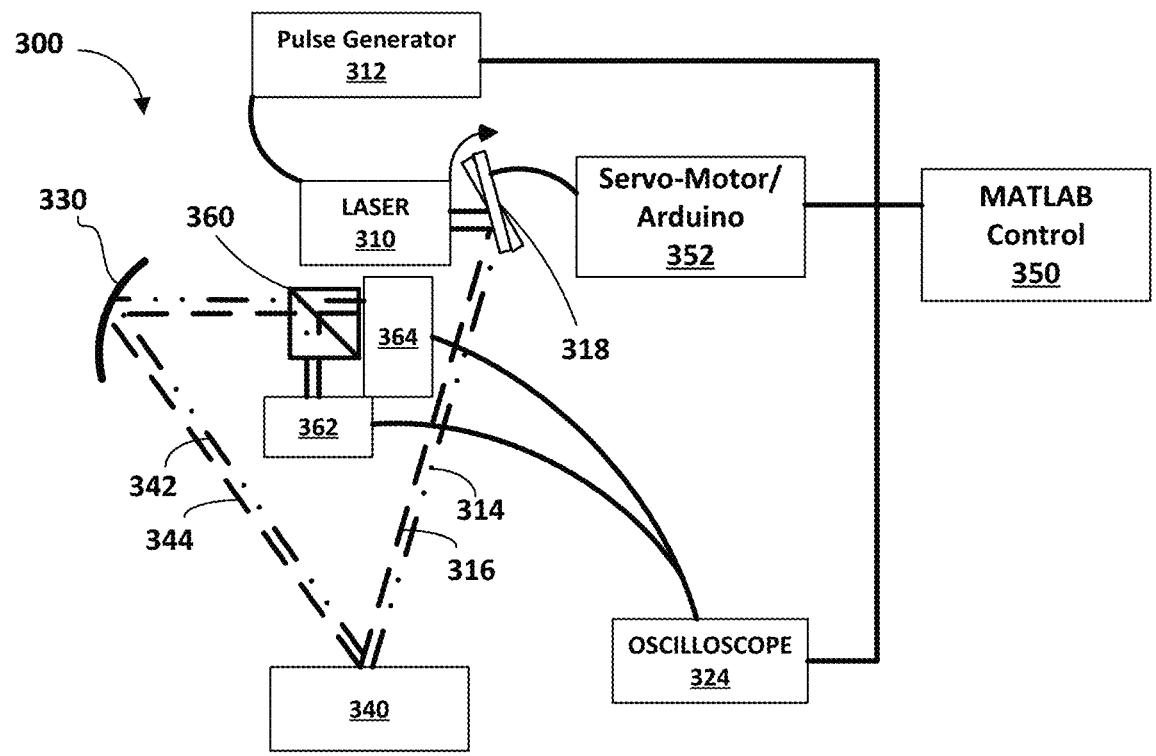
Figure 12:
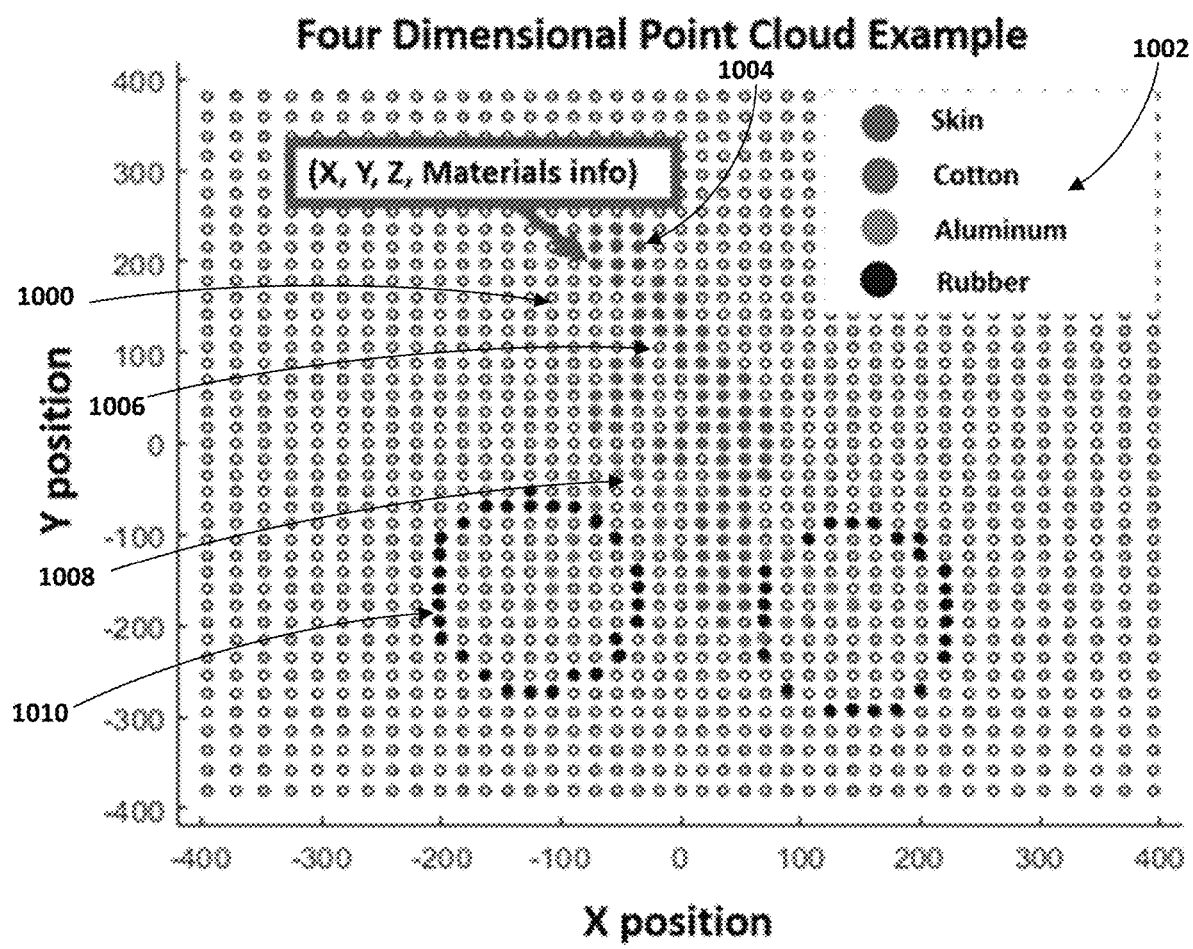
Figure 13:
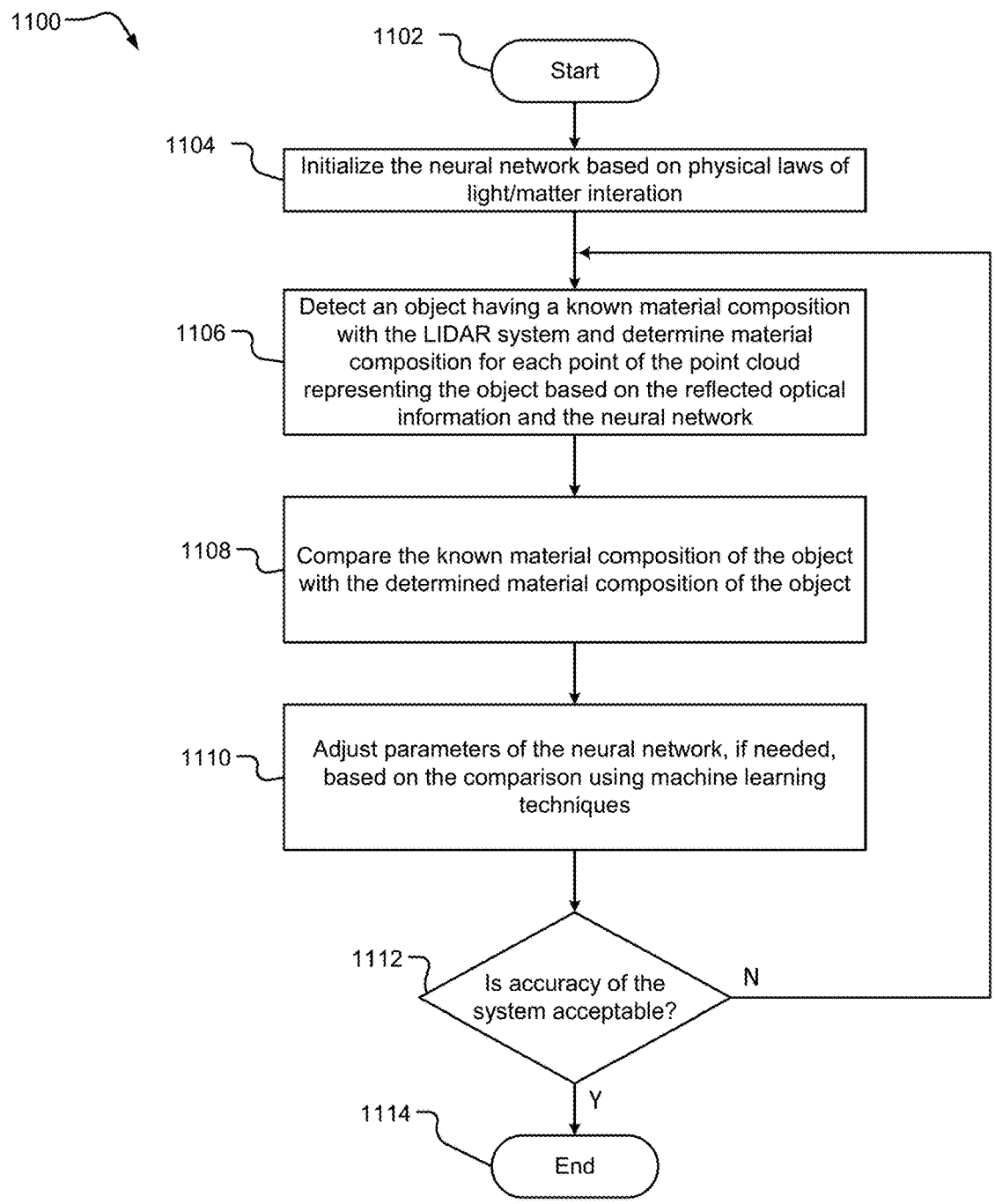
Figure 14:
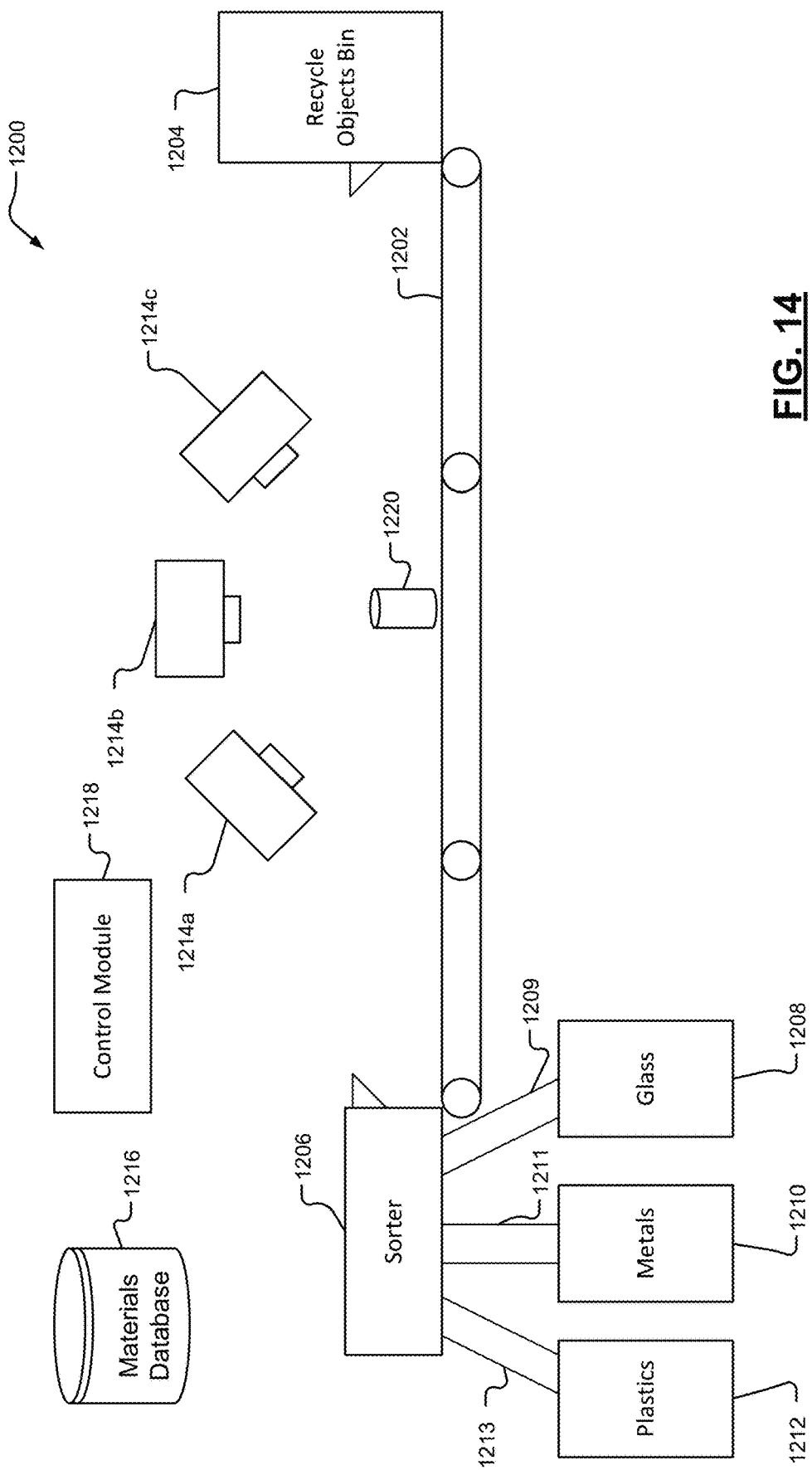
Figure 15:
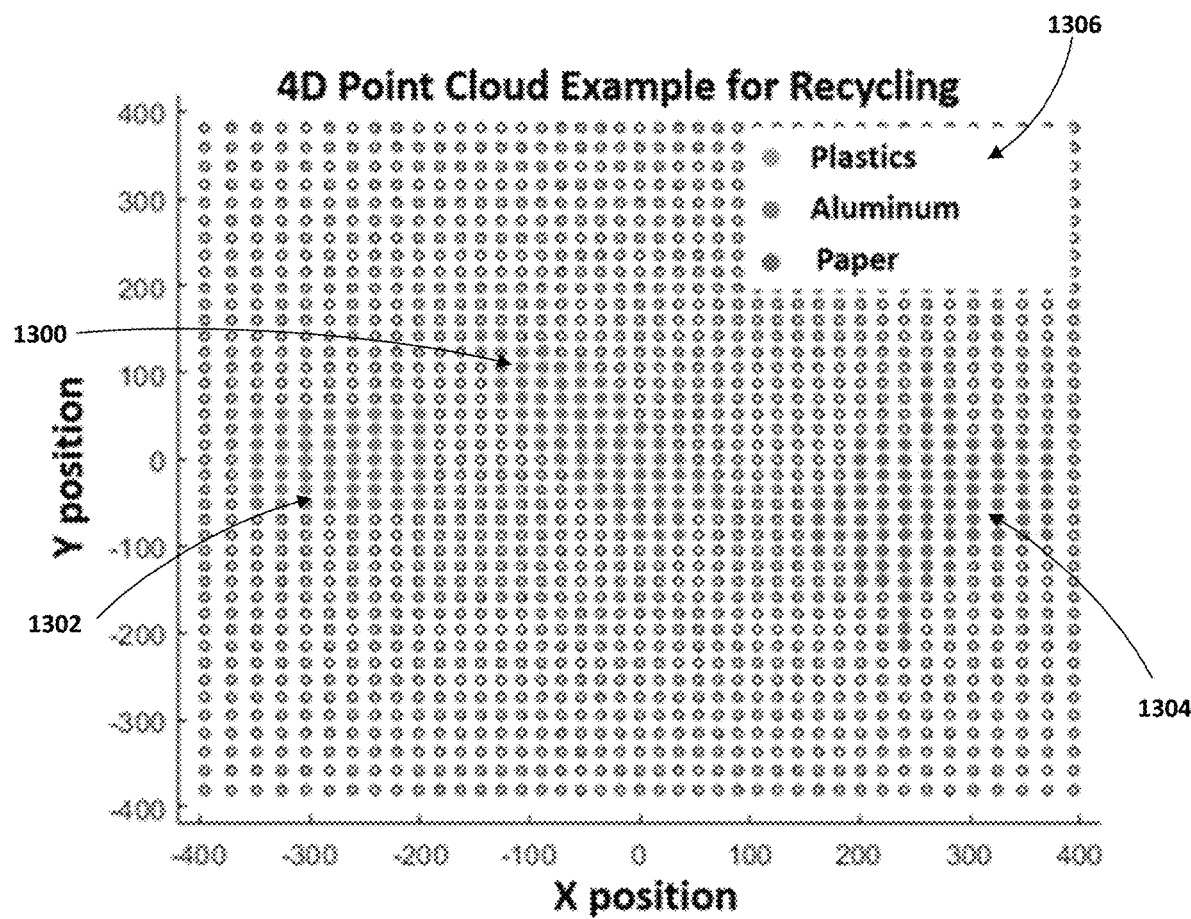
Figure 16:
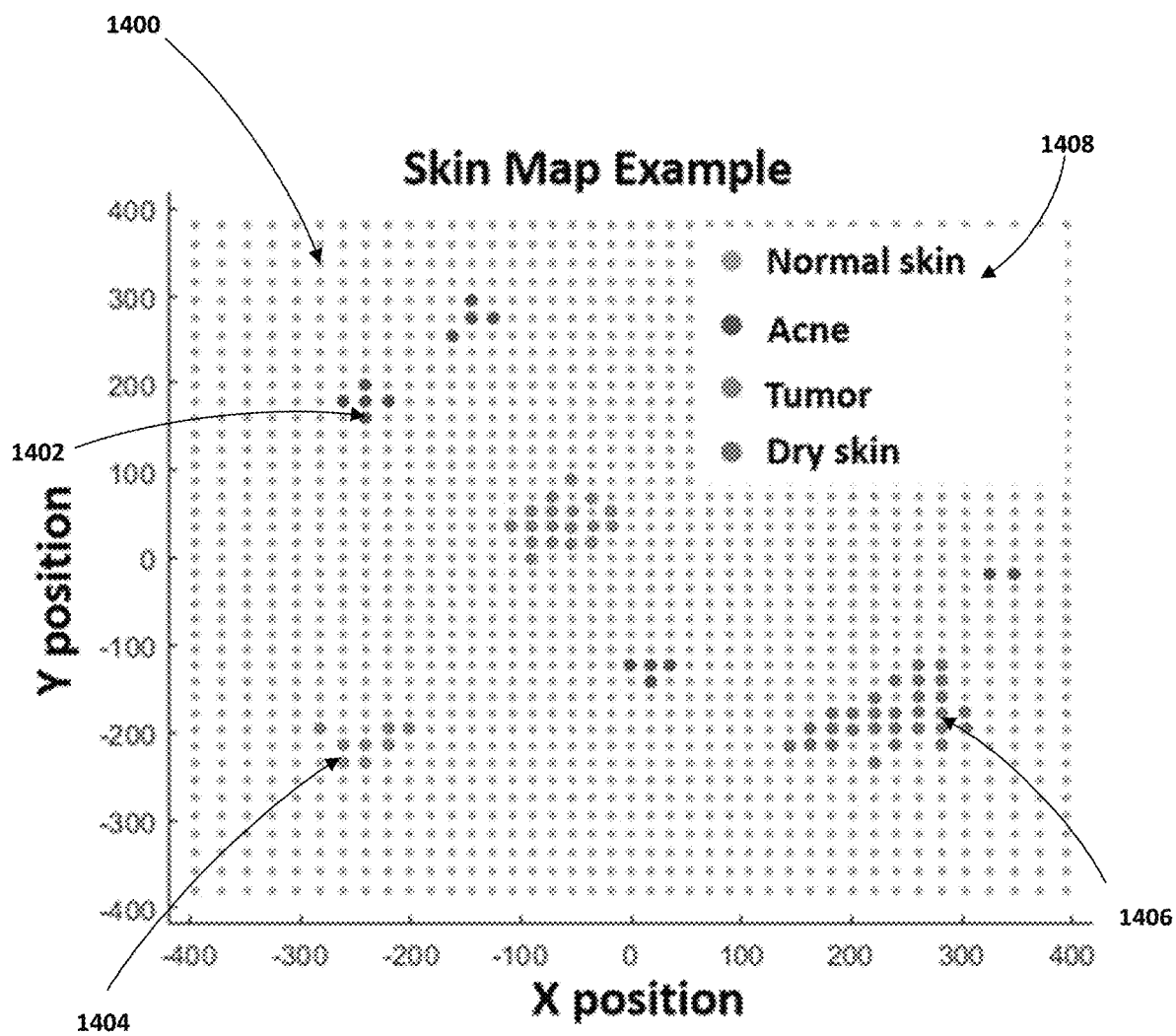
Figure 17A:
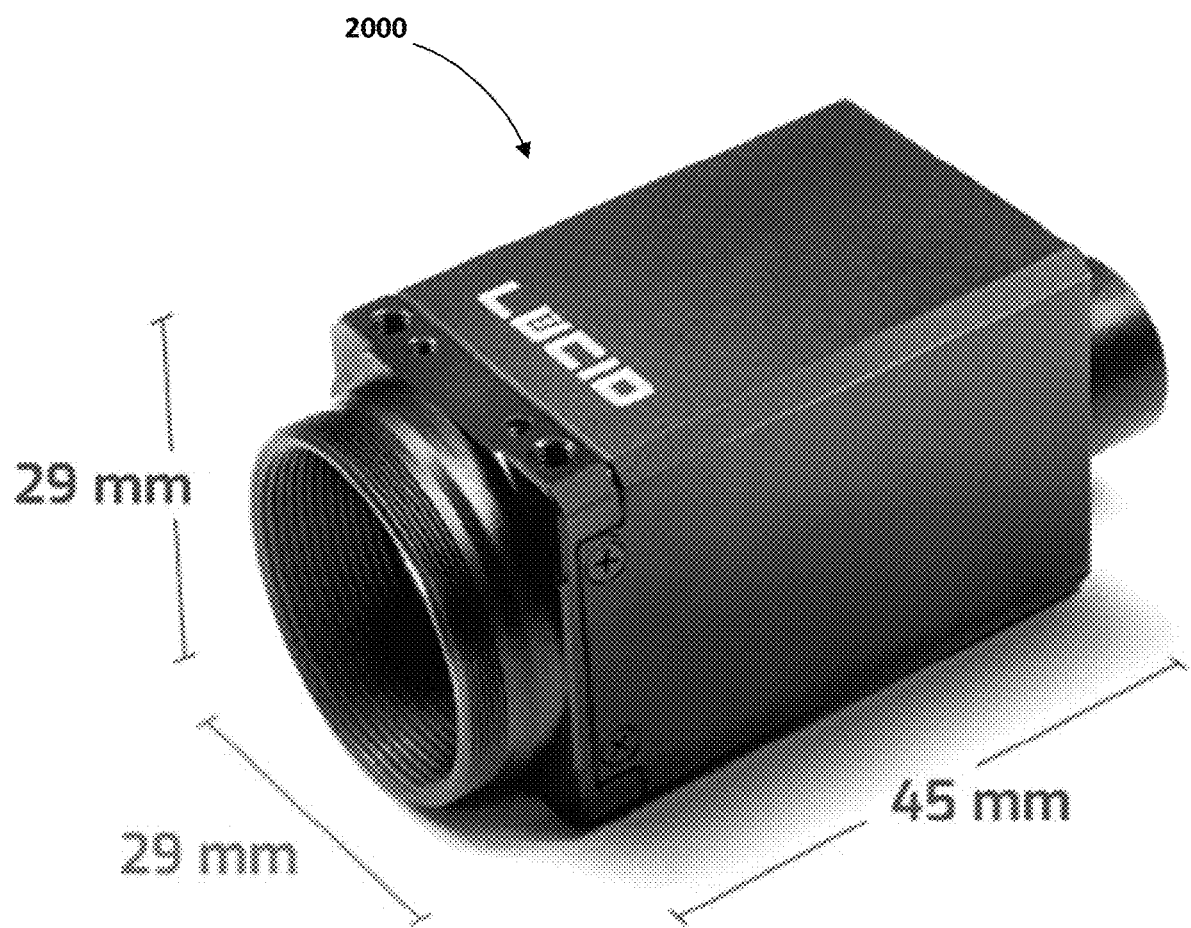
Figure 17B:
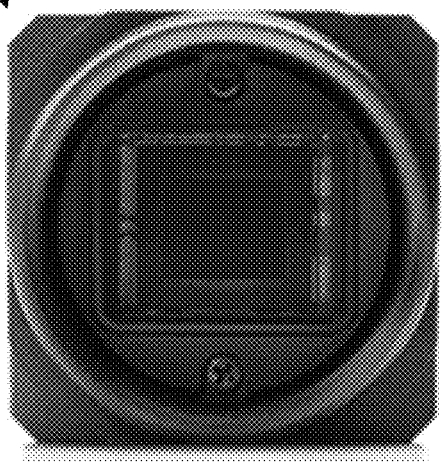
Figure 17C:
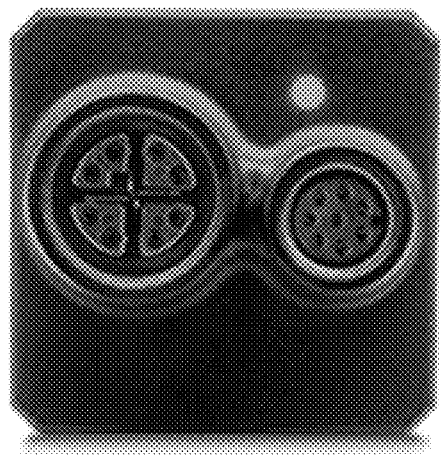
Figure 18:
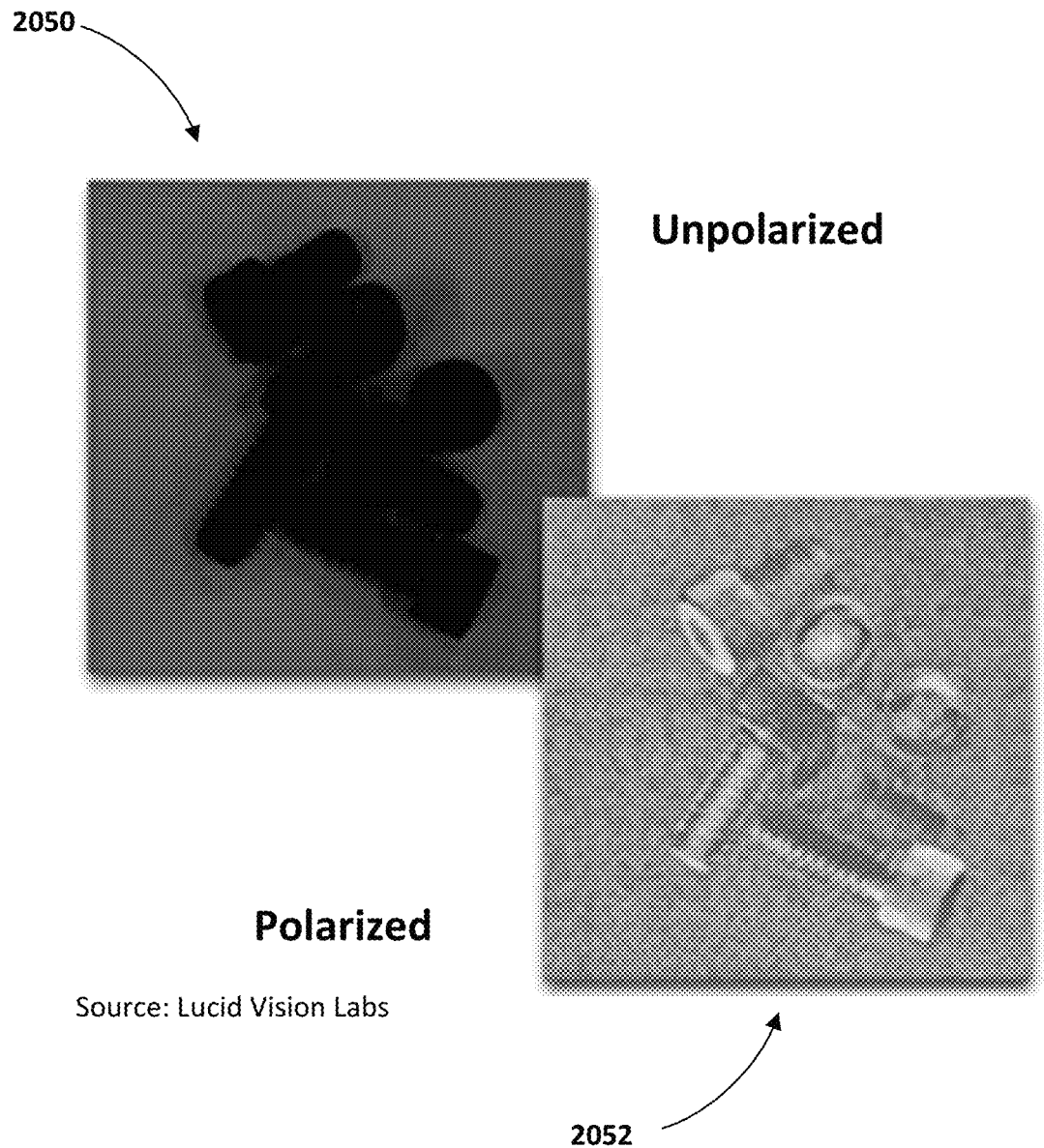
Figure 19:
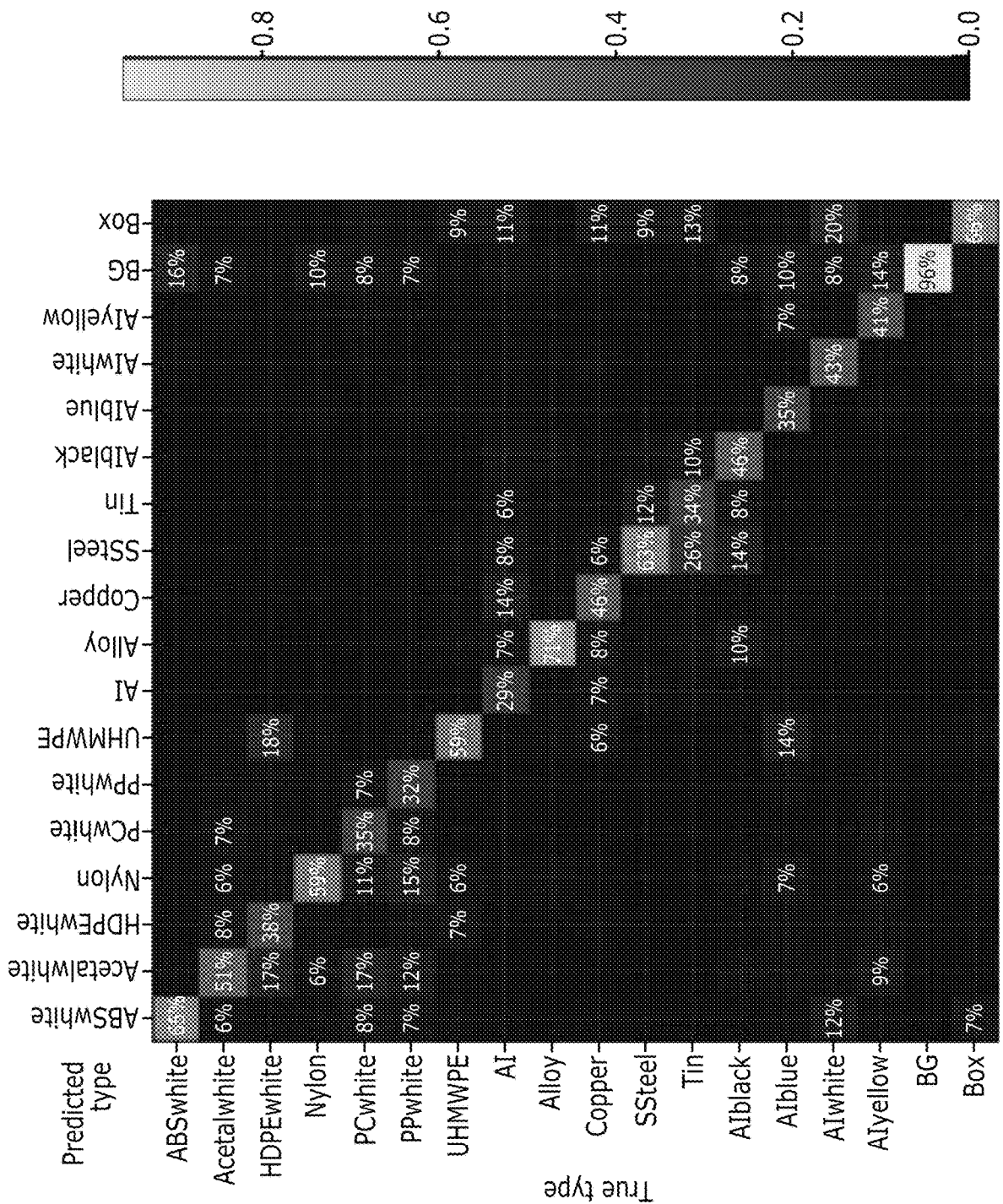

FIGS. 5a-5c illustrate a nano-kirigami nanocomposite optical element fabricated on a wafer according to certain aspects of the present disclosure. FIG. 5a shows a photograph of a nano-kirigami nanocomposite optical element, FIG. 5b shows an SEM image of the nano-kirigami nanocomposite optical element of FIG. 5a under 0% strain, while FIG. 5c illustrates a SEM image of the nano-kirigami nanocomposite optical element of FIG. 5a under 100% strain according to certain aspects of the present disclosure;

FIG. 6 illustrates a confusion matrix for MST using an artificial intelligence algorithm and polarization information according to certain aspects of the present disclosure;

FIG. 7 illustrates a confusion matrix for the detection of simulated black ice compared to other materials according to certain aspects of the present disclosure;

FIG. 8 illustrates one example of a black ice detection unit incorporating a M-LIDAR system according to certain aspects of the present disclosure;

FIG. 9 is a flowchart illustrating a method of performing object classification using an M-LIDAR system according to certain aspects of the present disclosure;

FIG. 10 is a schematic of a planar composite material having a representative plurality of kirigami cuts formed therein as a linear pattern;

FIG. 11 is a diagram illustrating an M-LIDAR system for mounting on a vehicle according to certain aspects of the present disclosure;

FIG. 12 illustrates a multidimensional point cloud of an object according to certain aspects of the present disclosure;

FIG. 13 is a flowchart illustrating a method of calibrating a neural network that outputs expected material information of an object based on inputted optical characteristics generated by a LIDAR system according to certain aspects of the present disclosure;

FIG. 14 is a diagram of an example recycling system according to certain aspects of the present disclosure;

FIG. 15 illustrates a multidimensional point cloud of an object according to certain aspects of the present disclosure;

FIG. 16 illustrates a multidimensional point cloud of skin of a patient according to certain aspects of the present disclosure;

FIG. 17A-C are images of a polarimetric camera;

FIG. 18 illustrates images of a group of objects using a non-polarimetric and polarimetric cameras; and FIG. 19 illustrates a confusion matrix for MST using an artificial intelligence algorithm and polarization information according to certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In certain aspects, the present disclosure provides LIDAR systems and methods configured to detect not only an object's distance, but also the object's material composition. According to some examples, material composition classification may be achieved by virtue of polarization analysis processed using machine learning algorithms.

The optical elements of the system described herein may be configured to bring all of the light emitted from a light source (e.g., a laser) to a known polarization state, such that the shift in polarization can be accurately measured later on. This light then travels until it reaches an object interface (the object being composed of one or more materials), at which point a portion of the light will be diffusely reflected back.

This disclosure describes, among other things, a new method of perception of surroundings by creating semantic maps of 3D space with the addition of materials and surface texture (MST) classification at each point of the LIDAR cloud. The MST classification inferred from the polarization signature of the returned photons may reduce the ambiguity of 3D point clouds and facilitate the recognition of various objects (metal points, glass points, rough dielectric points, etc.). The polarization classification may precede the surface tangent plane estimation and, therefore, may pre-identify the objects by grouping the points with similar polarization signatures. LIDARs that are equipped with MST classification will be referred to herein as M-LIDARs.

According to one example of the instant disclosure, the M-LIDAR technology may be configured to be lightweight and conformable through the use of kirigami optics, rather than conventional, bulky optics, such as near-infrared optics and the like. For example, LIDAR systems can employ kirigami composites as modulators, such as that described in U.S. application Ser. No. 16/518,230 filed on Jul. 22, 2019 to Kotov et al. entitled "Kirigami Chiroptical Modulators for Circular Dichroism Measurements in Terahertz and Other Parts of Electromagnetic Spectrum." Such systems may include utilization of periodically modified thin sheets of ultrastrong material capable of diffracting the light, such as the kirigami-based systems described in Xu et al., "Kirigami Nanocomposites as Wide-Angle Diffraction Gratings," *ACS Nano*, 10 (6), 6156-6162 (2016); Lizhi Xu, et al., "Origami and Kirigami Nanocomposites," *ACS Nano*, 11(8) 7587-7599 (2017). The relevant portions of all patents, patent applications, articles, and literature referenced or cited in this disclosure are hereby incorporated by reference herein.

Varying the strain applied onto the kirigami sheet component changes the diffraction angle of the laser beam. The modulation can also be realized by a piezo-electric device or by applying electrical field to conductive kirigami composites (Jing Lyu, et al., "Stretchable conductors by kirigami patterning of aramid-silver nanocomposites with zero conductance gradient," *Appl. Phys. Lett.*, 111, 161901 (2017)). Incorporating such kirigami composite modulators can provide wide-angle light-weight low-cost LIDARs. Moreover, kirigami modulators can be adapted to modulate a wide range of laser frequencies from optical to terahertz and beyond (W. J. Choi, et al., "Chiroptical Kirigami Modulators for Terahertz Circular Dichroism Spectroscopy Biomaterials," *Nature Materials*, 18, 820-826 (2019)).

According to one example, the M-LIDAR systems and methods described herein may be used in the detection of black ice for vehicles with different degree of automation.

Figure 1:
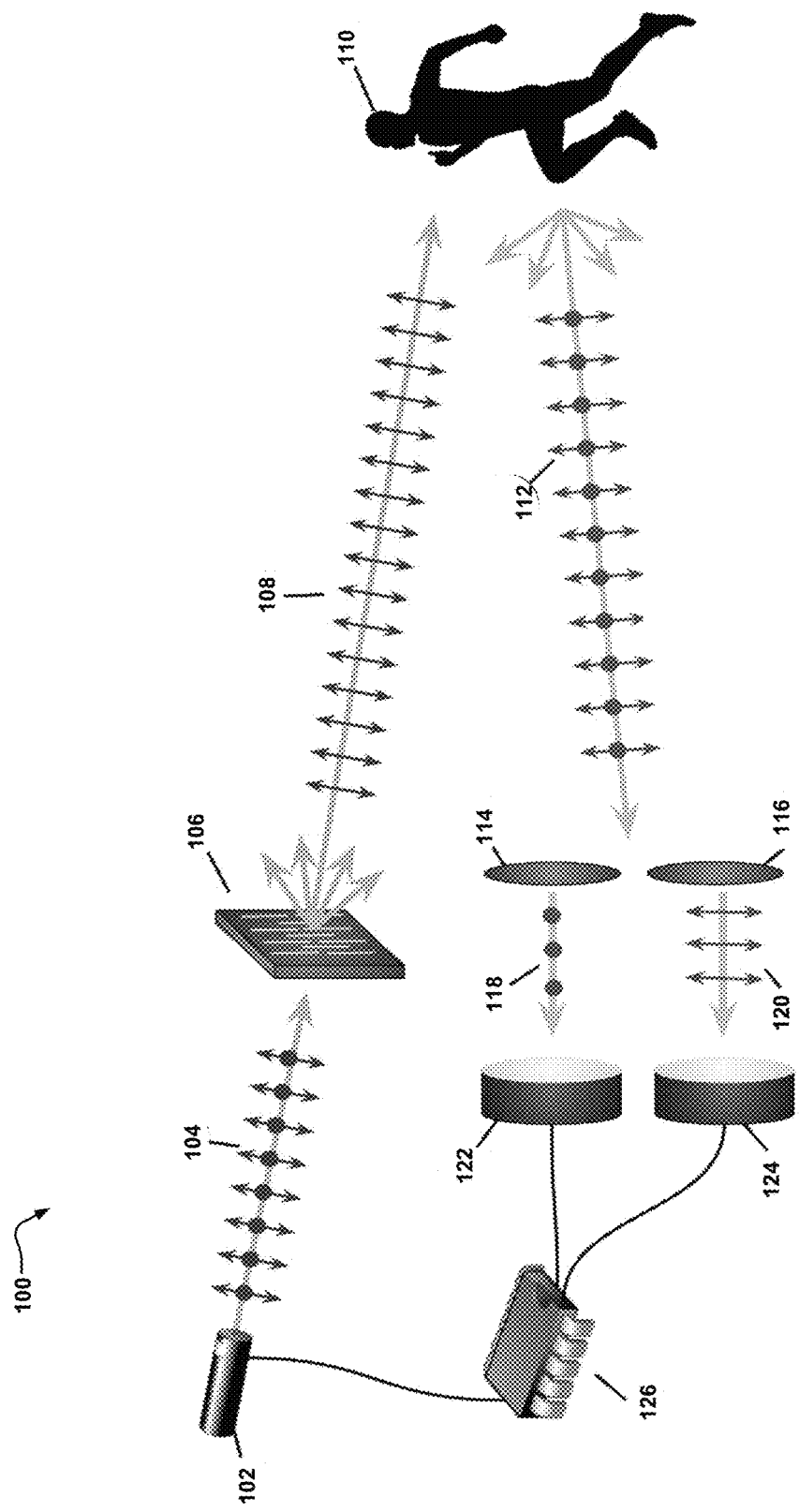
FIG. 1 is a functional diagram illustrating an M-LIDAR system according to certain aspects of the present disclosure.

Referring now to FIG. 1, a representative simplified M-LIDAR system is provided. The M-LIDAR system 100 may include a laser 102, a beam steerer 106, a first polarizer 114, a second polarizer 116, a first polarization detector 122, a second polarization detector 124, and a processor 126. Although FIG. 1 illustrates first and second polarizers 114, 116 and first and second polarization detectors 122, 124, according to some implementations, only a single polarizer (e.g., the first polarizer 114) and a single polarization detector (e.g., the first polarization detector 122) may be included as part of the system 100 without departing from the teachings of the present disclosure. Furthermore, according to certain examples, more than two polarizers and/or more than two polarization detectors may be included as part of the system 100 without departing from the teachings herein.

For purposes of simplicity and illustration, throughout the remainder of this disclosure the first polarizer 114 will be treated as an s-polarization linear polarizer 114. Similarly, for purposes of simplicity and illustration, the second polarizer 116 will be treated as a p-polarization linear polarizer 116. Further, the first polarization detector 122 will be treated as a p-polarization detector 122 and the second polarization detector will be treated as an s-polarization detector 124.

However, as will be appreciated by those having ordinary skill in the art, the polarizers 114, 116 may be configured for a variety of different types of polarization without deviating from the teachings herein. For example, a given polarizer may be configured to perform linear polarization (e.g., s or p type linear polarization), right-circular polarization, left-circular polarization, elliptical polarization, or any other suitable type of polarization known in the art. Similarly, a given detector may be configured to detect linearly-polarized light (e.g., s or p type linearly polarized light), right-circular polarized light, left-circular polarized light, elliptically-polarized light, or any other type of polarized light known in the art. According to some examples, the polarization of a light beam (i.e., a combination of two or more light pulses) may be modulated from pulse to pulse to obtain additional information about one or more objects under consideration.

As discussed in additional detail below, the system 100 may be configured to detect one or more materials making up an object 110, and classify the object 110 based, at least in part, on the detected materials. According to some examples, the object classification may be performed using one or more artificial intelligence algorithms including, but not limited to, neural network-based artificial intelligence.

In operation, the system 100 may function as follows. The laser 102 may be configured to generate (i.e., emit) one or more polarized or unpolarized light pulses, the one or more polarized or unpolarized light pulses collectively forming a polarized/unpolarized light beam 104. According to the example shown in FIG. 1, each pulse includes an s-polarization component (represented by the dots along the beam 104 in FIG. 1) and a transverse p-polarization component (represented by the double-sided arrows running in a perpendicular direction through the beam 104 in FIG. 1). Alternatively (and in conjunction with the preceding discussion on different types of polarized light), the pulses may include, for example, left and right circularly polarized sequences, elliptically polarized sequences, any combination of the foregoing, or any other suitably polarized light sequences.

According to some examples, the laser 102 may be configured to generate anywhere from one, to over one million, pulses a second. Furthermore, according to some implementations, the laser 102 may generate light having wavelengths in the ranges of visible light, ultraviolet light, infrared light, and the like. Visible light has wavelengths ranging from about 390 to about 750 nm and infrared radiation (IR) (including near infrared (NIR) ranging from about 0.75 to about 1.4 μm and far infrared (FIR) ranging from about 15 μm to 1 mm). The far infrared (FIR) part of the electromagnetic spectrum, also known as terahertz (THz) diapason, has photon wavelengths from about 100 μm to about 1 mm and energies from about 0.001 eV to about 0.01 eV. In certain variations the laser 102 may generate a 550 nanometer (nm), 808 nm, 905 nm, or 1550 nm pulsed laser—or any other suitable wavelength of laser—without deviating from the teachings of the instant disclosure. For example, implementations for home robotics, autonomous vehicles, and machine vision may employ lasers having eye-safe frequencies above 800 nm. For outdoor applications, light beams in the water transparencies windows—around 900 nm to 1550 nm, for example—may be suitably employed. According to some implementations, upon a given pulse being generated by the laser 102, the processor 126—executing executable instructions—may record the initial time that the pulse is generated. This "time-of-flight" information may be subsequently utilized to calculate a distance to the object 110 by using the speed of light.

The beam 104 may be directed by the laser 102 through the beam steerer 106. The beam steerer 106 may be configured to produce a polarization-adjusted light pulse. In certain aspects, a polarization of each polarized/unpolarized pulse of the polarized/unpolarized light beam 104 is adjusted by the beam steerer 106. As used herein, adjusting a polarization may include imparting a polarization or changing a polarization. Thus, the beam steerer 106 may adjust a polarization of each polarized/unpolarized pulse of the polarized/unpolarized light beam 104 to produce one or more linearly polarized light pulses (the linearly polarized light pulses collectively forming a linearly polarized light beam a). While the foregoing example contemplates linear polarization, the beam steerer 106 may, according to some examples, circularly (e.g., left or right) or elliptically polarize the beam 104. According to another example, the beam steerer 106 may not apply any polarization to the beam at all. For example, if the beam 104 is already polarized as it enters the beam steerer 106, the beam steerer 106 may further modify the properties of the polarization-adjusted light pulse produced (e.g., split or modulate the pulses), but may not need to adjust the polarity of the previously polarized light pulse. Further still, according to some examples, the beam steerer 106 may polarize a first pulse of a beam according to a first type of polarization and polarize a second pulse of the same beam according to a second, different type of polarization. In addition to, or as an alternative to, performing polarization of the beam 104, the beam steerer 106 may also control the direction of any beam (e.g., beam 108) emitted therefrom. Further still, the beam steerer 106 may split a beam (e.g., beam 104) into several different beams, whereby one or more of the beams are emitted a defined angles, to steer multiple beams at a time. This concept is illustrated in FIG. 1 with regard to the many diverging arrows emanating from the beam steerer 106.

In addition, or alternatively, in some examples, the beam steerer 106 may be configured to modulate the linearly polarized light beam 108. In one example, the beam steerer 106 may include a kirigami nanocomposite beam steerer or the like. According to this example, and as discussed in additional detail below, the beam steerer 106 may be configured to linearly polarize and/or modulate the linearly polarized light beam 108 by increasing or decreasing an amount of strain applied to the kirigami nanocomposite beam steerer.

Furthermore, according to one example, the beam steerer 106 may be configured to linearly polarize each unpolarized pulse of the unpolarized light beam 104 by linearly polarizing each unpolarized pulse of the unpolarized light beam 104 for p-polarization. This example is illustrated in FIG. 1 where it can be seen that the beam 104, after passing through the beam steerer 106, no longer includes any s-polarization components (i.e., "dot" components shown in beam 104 are absent in linearly polarized light beam 108). In alternative aspects, the linearly polarized light beam 108 may instead be p-polarized. Further, in certain aspects, the beam steerer 106 may modify, control, and steer the linearly polarized light beam 108 emitted towards object 110, as will be discussed further herein. The beam steerer 106 may enable dynamic, wavelength-dependent beam steering and amplitude modulation of electromagnetic waves.

Continuing with FIG. 1, the linearly polarized light beam 108 may be diffusively reflected off the object 110. One or more pulses of light collectively form a beam 112 that constitutes a reflected version of the linearly polarized light beam 108. According to some examples, the reflected linearly polarized light beam 112 may have a different polarization than the linearly polarized light beam 108 (i.e., the beam pre-reflection off of the object 110). This difference in status is illustrated by virtue of the beam 112 including both p-polarization and s-polarization components (reflected, respectively, by the dots and double-sided arrows along the path of the beam 112), whereas the beam 108 only is shown to include p-polarization components. Further, the object 110 may include any suitable object (or target) made up of one or more different materials of which detection is desired. Although discussed above and in the sections that follow as being a reflected "linearly" polarized light beam 112, according to certain examples, the reflected beam 112 may be polarized in a variety of different ways, including circularly or elliptically, without deviating from the teachings herein.

The reflected linearly polarized light beam 112 diffusively reflected off, scattered off of, or otherwise emitted by the object 112 may pass through the s-polarization linear polarizer 114 and/or the p-polarization linear polarizer 116 of the system 100. In certain aspects, respective portions of the reflected, scattered, or otherwise emitted linearly polarized light beam 112 passes through both the s-polarization linear polarizer 114 and/or the p-polarization linear polarizer 116 of the system 100. The s-polarization linear polarizer 114 is configured to linearly polarize the one or more light pulses making up the beam 112 for s-polarization to produce one or more reflected s-polarization light pulses (the one or more reflected s-polarization light pulses collectively forming a reflected s-polarization light beam 118). Similarly, the p-polarization linear polarizer 116 is configured to linearly polarize the one or more light pulses making up the beam 112 for p-polarization to produce one or more reflected p-polarization light pulses (the one or more reflected p-polarization light pulses collectively forming a reflected p-polarization light beam 120). According to some examples, the s-polarization linear polarizer 114 and/or the p-polarization linear polarizer 116 may include a kirigami nanocomposite or the like, such as kirigami nanocomposites of the types discussed above with regard to the beam steerer 106 and/or below with regard to FIGS. 4a-4d and 5a-5c. However, those having ordinary skill in the art will recognize that non-kirigami nanocomposites or other optic devices may be employed as part of the system 100, according to some examples, without deviating from the teachings herein.

Similar arrangements of polarizers 114, 116 may be utilized, according to some examples, for the polarization of left and right circularly polarized light or elliptically polarized light reflected, scattered or otherwise emitted off/from the object 110.

An s-polarization detector 122 may be configured to detect an intensity of each of the one or more reflected s-polarization light pulses forming the reflected s-polarization light beam 118. In addition, according to some implementations, the s-polarization detector 122 may be configured to detect an angle of incidence associated with the reflected s-polarization light beam 118. The detected intensity of the one or more reflected s-polarization light pulses forming the reflected s-polarization light beam 118 and/or the detected angle of incidence associated with the reflected s-polarization light beam 118 may be utilized by the processor 126 to perform material type detection (using, for example, MST classification), as discussed in additional detail below.

Similarly, a p-polarization detector 124 may be configured to detect an intensity of each of the one or more reflected p-polarization light pulses forming the reflected p-polarization light beam 120. In addition, according to some implementations, the p-polarization detector 124 may be configured to detect an angle of incidence associated with the reflected p-polarization light beam 120. The detected intensity of the one or more reflected p-polarization light pulses forming the reflected p-polarization light beam 120 and/or the detected angle of incidence associated with the reflected p-polarization light beam 120 may also be utilized by the processor 126 to perform material type detection, as discussed in additional detail below.

The processor 126 is configured to detect at least one material of the object 110 based on (i) the detected intensities of the one or more light pulses forming beams 118 and/or 120 and/or (ii) the detected angles of incidence associated with the reflected s-polarization light beam 118 and/or the reflected p-polarization light beam 120. More specifically, according to some examples, the processor 126 is configured to apply machine-learning algorithms to detect the one or more materials making up the object 110. As used herein, "applying a machine-learning learning algorithm" may include, but is not limited to, executing executable instructions stored in memory and accessible by the processor. In addition, according to one example, the specific machine-learning algorithm used for material detection may include an artificial neural network. However, other machine-learning algorithms known in the art may be suitably employed without deviating from the teachings of the instant disclosure.

Furthermore, according to some examples, the processor 126 may be configured to classify the object 110 based on the detected material(s) of the object 110 by applying a machine-learning algorithm. Again, the machine learning algorithm used for object classification may include an artificial neural network. However, other machine-learning algorithms known in the art may be suitably employed without deviating from the teachings of the instant disclosure.

Before turning to FIG. 2, the following reflects an overview of the process for detecting the material(s) of an object utilizing a M-LIDAR system, such as the system 100 shown in FIG. 1

As noted above, one aim of the instant disclosure is to enable the detection of object materials and to reduce the data processing necessary for modern LIDAR devices by obtaining more data at each point in the point cloud. This additional polarization data, when combined with machine learning algorithms, enables material detection, which simplifies object recognition for a variety of applications including, but not limited to, autonomous vehicles, machine vision, medical applications (e.g., devices to assist the blind), and advanced robotics.

An M-LIDAR system according to example implementations of the instance disclosure may operate as follows. The pair of detectors (e.g., detectors 122, 124) with perpendicularly oriented linear polarizers (e.g., polarizers 114, 116) may be used to measure the return light (e.g., the one or more pulses of light constituting the reflected version of the linearly polarized light beam 112). Some of the diffusely backscattered light (e.g., reflected light 112) may be directed at the detectors (e.g., detectors 122, 124) and pass through the narrow band interference filters (e.g., linear polarizers 114, 116) placed in front of each detector pair (e.g., detector pair 122/124). The narrow band interference filters may only allow a small range of wavelengths to pass through (e.g., 1-2 nm), which may reduce undesired noise from ambient lighting or external sources.

According to other examples of the foregoing system, the system may be configured to detect, and perform machine-learning processing upon, circularly and/or elliptically polarized light reflected, scattered, or otherwise emitted by an object.

Due to this selectivity, an M-LIDAR system in accordance with the present disclosure (e.g., system 100) may be configured to simultaneously measure multiple wavelengths, completely independently. The coherent light may then be polarized using, for example, a co-polarizer and/or cross-polarizer. The intensity of light may decrease by some amount as it travels through the polarizers, depending on the shift in polarization upon reflecting off of the object (e.g., object 110). Beam focusing optics (e.g., polarizers 114, 116) may direct the coherent, polarized light (e.g., beams 118, 120) towards the detection surface (e.g., the surfaces of detectors 122, 124), and the angle from which the returned light travelled (i.e., the angle(s) of incidence) can be detected based on the location the light strikes on the detection screen.

Once the detectors identify light, the time-of-flight sensor (e.g., the time of flight sensor implemented in the processor 126) may record the travel time of that light pulse. Each light pulse may have its intensity measured for both the co-polarized and cross-polarized detectors, and these two values in combination allow the polarization effects caused during the reflection to be quantified.

Following this process, the following parameters may be detected: (i) initial angle(s) at which the beam was steered; (ii) angle(s) from which the backscattered light returns; (iii) the time-of-flight from emission to detection; and (iv) the intensity at each detector.

Note that due to the detectors being at different locations, a single pulse of light may take a slightly different amount of time to reach each detector. By understanding the system geometry as well as the relationship between intensity and distance, this difference can be compensated for and the intensity at one detector precisely adjusted. The time-of-flight data may be used to determine the distance between the source (e.g., the laser 102) and the object (e.g., the object 110), and—in conjunction with the initial and return angle—the specific location of that point in space, relative to the M-LIDAR system, can be determined. These compensated intensity values may contain information indicative of the material off of which the light pulse reflected. Making use of these values, machine learning algorithms may provide robust and comprehensive material recognition capabilities.

The process described above of emitting a pulse of light, the light diffusely reflecting off an object, the reflected light being measured by the detectors, and the location of the object relative to the source being determined may be repeated on the order of one to millions of times per second. A point is generated each time, and these points are mapped onto the same coordinate system to create a point cloud.

Once the point cloud is generated, one or more machine learning algorithms may be used to cluster points into objects, and ultimately characterize the respective material(s) of each object (e.g., where a plurality of objects is detected). Points may be clustered based on, for example, one or more values of the measured intensities, also, in some examples, based on proximity of similar points.

Once a cluster is determined using intensity values, a machine learning or an artificial intelligence algorithm may be used to correlate the measured value to a database of known materials to classify the material of that cluster of points. This process may be repeated for all clusters in the system. An understanding of surrounding materials enables the system (e.g., as implemented in an automobile, robot, drone, etc.) to make faster, more educated decisions about what the objects themselves might be. From there, factors such as risk involved can be assessed and decisions can be subsequently made (e.g., in the case of the system detecting black ice ahead of a vehicle). As the process continues over time, more information can be extracted from changes perceived and an even better understanding of the surroundings developed.

The MST classification technology is also applicable to the detection of an object whose surface is modified to enhance detection, for example, that is painted or textured with a macroscale, microscale, nanoscale, or molecular pattern to produce the reflected beams with the specific optical response adapted to the fast MST classification by LIDARs. Examples of such surface treatment include paints containing additives that produce reflected, scattered or otherwise emitted light with specific linear, circular, or elliptical polarization. In one instance, metal nano/micro/macro wires or axial carbon nanomaterials are added to the base paint. An alignment pattern can be random, linear, spiral, herring-bone or any other pattern that produces the specific polarization signature enabling fast identification of a specific object. By way of non-limiting example, this may be used for creating markers on roads, road signs, barriers, pylons, guard rails, vehicles, bicycles, clothing, and other objects.

Another implementation of surface treatment facilitating MST classification may include the addition of chiral inorganic nanoparticles to base paint used to coat such objects described above, such as road markers, vehicles, bicycles, clothing, etc. The chiral nanoparticles may display a specific and very strong circular polarization response to the beams used by the LIDARs. They can be mixed in the paint with a specific ratio to create polarization signatures (e.g., "barcodes") for specific objects.

Another example of polarization tagging of an object may include using surface texturing that creates a particular polarization response. One example of such texturing may include creating nanoscale patterns of metal, semiconductor, insulating or ceramic nanoparticles with specific geometrical characteristics resulting in a defined polarization response to the laser in LIDARs. Two examples of such patterns include (a) linear nanoscale or microscale surface features that result in a linear polarization of the reflected, scattered, or emitted light from an object and (b) out-of-plane protruding chiral patterns on the metal surfaces resulting in a specific chirality and therefore circular polarization of the reflected, scattered, or emitted light from an object.

According to some examples, the foregoing system and method may be employed to accurately recognize materials for use in autonomous vehicles, machine learning, medical applications, and advanced robotics.

Existing, conventional LIDAR systems primarily work via measurement of the distance between an object and the laser source, typically using either time-of-flight data or phase shifts. In such cases, the objects are classified based on geometries and patterns in the arrangement of points in the cloud. Some more advanced LIDAR point cloud classification methods make use of an additional parameter: overall intensity.

Based on how strong the signal of the returning light pulse is, a system can effectively detect differences in color. This additional piece of data makes it easier to recognize object boundaries within point clouds, decreasing the amount of processing required to classify all points. However, applications like autonomous vehicles may require a higher degree of certainty, which overall intensity cannot achieve. Furthermore, the detection of objects at long distances may be achieved with a single point detection taking advantage of MST classification, rather than multiple point detection and processing of the type employed in conventional LIDAR systems.

Accordingly, the method described herein changes the approach machine vision currently takes towards object recognition. Instead of solely relying on geometry, movement, and color to determine the identity of an object, the system described herein takes into account yet another parameter: polarization. Upon reflecting off of a material interface, light experiences some change in polarization. This polarization change is quantified by measuring the intensities of light after having passed through both co-polarized and cross-polarized filters. This additional data may be paired with machine learning approaches to significantly improve clustering, and by extension, object recognition capabilities. Traditional object recognition methods are quite computationally expensive. The approach described herein may significantly reduce the processing power required by LIDAR by using a material-based approach rather than the current, geometry-based approach.

In addition to traditional distance measurements, the polarization data collected by the instant system allows machine learning algorithms to determine the material(s) from which an object is composed. Current LIDAR systems lack awareness or information about the materials in a surrounding environment. When achieved, such information provides context for greater situational understanding and smarter decisions. In the case of an autonomous vehicle, this enhanced understanding of the environment may lead to improved safety of the passengers because accurate, timely detection of potential hazards produce improved decision-making capabilities Turning now to FIGS. 2a-2b, scanning electron microscope (SEM) images of nano-kirigami sheets are shown that may be used to form the nano-kirigami nanocomposite optic components incorporated into an M-LIDAR system. The optically active kirigami sheets, such as those shown in FIGS. 2a-2b, may be manufactured from ultra-strong nanoscale composites with cut patterns of 0.5-5 µm in length, according to some examples of the present disclosure. In certain aspects, composite materials (including highly conductive composite materials) can be modified by using a concept from the ancient Japanese art of paper cutting known as "kirigami." See Lizhi Xu, et al., "Kirigami Nanocomposites as Wide-Angle Diffraction Gratings," *ACS Nano*, 10 (6), 6156-6162 (2016). Lizhi Xu, et al., "Origami and Kirigami Nanocomposites," *ACS Nano*, 11(8) 7587-7599 (2017). A kirigami approach can be used to engineer elasticity by using a plurality of cuts or notches that create a network on a planar polymeric material, such as a composite or nanocomposite material. Such cuts (extending from one side to the other of the material, for example, in a polymeric or composite material) can be made by top-down patterning techniques, such as photolithography, to uniformly distribute stresses and suppress uncontrolled high-stress singularities within the polymeric or nanocomposite material. This approach can prevent unpredictable local failure and increases the ultimate strain of rigid sheets from 4% to 370%, by way of non-limiting example.

By using microscale kirigami patterning, a stiff nanocomposite sheet can acquire high extensibility. Moreover, kirigami cut-patterned composite sheets maintain their electrical conductance over the entire strain regime, in marked contrast to most stretchable conductive materials. The kirigami structure may comprise a composite, such as a nanocomposite. In certain aspects, the kirigami structure may be a multilayered structure having at least two layers, where at least one layer is a polymeric material. The polymeric material may be a composite or nanocomposite material. The composite material comprises a matrix material, such as a polymer, a polyelectrolyte, or other matrix (e.g., cellulose paper), and at least one reinforcement material distributed therein. In certain aspects, nanocomposite materials are particularly suitable for use in a kirigami structure, which is a composite material comprising a reinforcement nanomaterial, such as nanoparticles. The composite may be in the form of a sheet or film in certain variations.

A "nanoparticle" is a solid or semi-solid material that can have a variety of shapes or morphologies, however, which are generally understood by those of skill in the art to mean that the particle has at least one spatial dimension that is less than or equal to about 10 µm (10,000 nm). In certain aspects, a nanoparticle has a relatively low aspect ratio (AR) (defined as a length of the longest axis divided by diameter of the component) of less than or equal to about 100, optionally less than or equal to about 50, optionally less than or equal to about 25, optionally less than or equal to about 20, optionally less than or equal to about 15, optionally less than or equal to about 10, optionally less than or equal to about 5, and in certain variations, equal to about 1. In other aspects, a nanoparticle that has a tube or fiber shape has a relatively high aspect ratio (AR) of greater than or equal to about 100, optionally greater than or equal to about 1,000, and in certain variations, optionally greater than or equal to about 10,000.

In certain variations, a nanoparticle's longest dimension is less than or equal to about 100 nm. In certain embodiments, the nanoparticles selected for inclusion in the nanocomposite are electrically conductive nanoparticles that create an electrically conductive nanocomposite material. The nanoparticles may be substantially round-shaped nanoparticles, that have low aspect ratios as defined above, and that have a morphology or shape including spherical, spheroidal, hemispherical, disk, globular, annular, toroidal, cylindrical, discoid, domical, egg-shaped, elliptical, orbed, oval, and the like. In certain preferred variations, the morphology of the nanoparticle has a spherical shape. Alternatively, the nanoparticle may have an alternative shape, such as a filament, fiber, rod, a nanotube, a nanostar, or a nanoshell. The nanocomposite may also include combinations of any such nanoparticles.

Furthermore, in certain aspects, a particularly suitable nanoparticle for use in accordance with the present teachings has a particle size (an average diameter for the plurality of nanoparticles present) of greater than or equal to about 10 nm to less than or equal to about 100 nm. The conductive nanoparticles may be formed of a variety of conductive materials including metallic, semiconducting, ceramic, and/or polymeric nanoscale particles having plurality of shapes. The nanoparticles may have magnetic or paramagnetic properties. The nanoparticles may comprise conductive materials, such as carbon, graphene/graphite, graphene oxide, gold, silver, copper, aluminum, nickel, iron, platinum, silicon, cadmium, mercury, lead, molybdenum, iron, and alloys or compounds thereof. Thus, suitable nanoparticles can be exemplified by, but are not limited to, nanoparticles of graphene oxide, graphene, gold, silver, copper, nickel, iron, carbon, platinum, silicon, seedling metals, CdTe, CdSe, CdS, HgTe, HgSe, HgS, PbTe, PbSe, PbS, $MoS_2$, $FeS_2$, FeS, FeSe, $WO_{3-x}$, and other similar materials known to those of skill in the art. Graphene oxide is a particularly suitable conductive material for use as reinforcement in the composite. In certain variations, the nanoparticles can comprise carbon nanotubes, such as single walled nanotubes (SWNTs) or multi-walled nanotubes (MWNTs), for example. SWNTs are formed from a single sheet of graphite or graphene, while MWNTs include multiple cylinders arranged in a concentric fashion. The typical diameters of SWNT can range from about 0.8 nm to about 2 nm, while MWNT can have diameters in excess of 100 nm.

In certain variations, the nanocomposite may comprise a total amount of a plurality of nanoparticles of greater than or equal to about 1% by weight to less than or equal to about 97% by weight, optionally greater than or equal to about 3% by weight to less than or equal to about 95% by weight, optionally greater than or equal to about 5% by weight to less than or equal to about 75% by weight, optionally greater than or equal to about 7% by weight to less than or equal to about 60% by weight, optionally greater than or equal to about 10% by weight to less than or equal to about 50% by weight of a total amount of nanoparticles in the nanocomposite. Of course, appropriate amounts of nanoparticles in a composite material depend upon material properties, percolation thresholds, and other parameters for a particular type of nanoparticle in a specific matrix material.

In certain variations, the nanocomposite may comprise a total amount of a polymeric matrix material of greater than or equal to about 1% by weight to less than or equal to about 97% by weight, optionally greater than or equal to about 10% by weight to less than or equal to about 95% by weight, optionally greater than or equal to about 15% by weight to less than or equal to about 90% by weight, optionally greater than or equal to about 25% by weight to less than or equal to about 85% by weight, optionally greater than or equal to about 35% by weight to less than or equal to about 75% by weight, optionally greater than or equal to about 40% by weight to less than or equal to about 70% by weight of a total amount of matrix material in the nanocomposite.

In certain variations, the nanocomposite material comprises a plurality of electrically conductive nanoparticles and has an electrical conductivity of greater than or equal to about $1.5 \times 10^3$ S/cm. In certain other aspects, the nanocomposite material may comprise a plurality of electrically conductive nanoparticles as a reinforcement nanomaterial and thus may have an electrical resistivity of less than or equal to about $1 \times 10^{-4}$ Ohm·m. In certain other variations, an impedance (Z) of the electrically conductive nanocomposite comprising a plurality of nanoparticles may be less than or equal to about $1 \times 10^4$ Ohms (e.g., measured using an AC sinusoidal signal of 25 mV in amplitude with impedance values measured at a frequency of 1 kHz).

The polymeric or nanocomposite material may be in a planar form, such as a sheet, in an initial state (prior to being cut), but may be folded or shaped into a three-dimensional structure and thus used as a structural component after the cutting process. By way of example, a structure 220 including a portion of an exemplary nanocomposite material sheet 230 having a surface with tessellated cut pattern is shown in FIG. 10. Sheet 230 includes a first row 232 of first discontinuous cuts 242 (that extend through the sheet 230 to create an opening) in a pattern that defines a first uncut region 252 between the discontinuous cuts 242. A discontinuous cut is a partial or discrete cut formed in the sheet that leaves the entire sheet intact in its original dimensions, rather than being divided into separate smaller sheets or portions. If multiple discontinuous cuts 242 are present, at least some of them are noncontiguous and unconnected with one another so that at least one uncut region remains on the sheet as a bridge between the discontinuous sheets. While many cut patterns are possible, a simple kirigami pattern of straight lines in a centered rectangular arrangement as shown in FIG. 10 is used herein as an exemplary pattern. The first uncut region 252 has a length "x." Each discontinuous cut 242 has a length "L."

In certain aspects, the length of each discontinuous cut (e.g., discontinuous cut 242) may be on the micro- meso-, nano- and/or macroscales. Macroscale is typically considered to have a dimension of greater than or equal to about 500 µm (0.5 mm), while mesoscale is greater than or equal to about 1 µm (1,000 nm) to less than or equal to about 500 µm (0.5 mm). Microscale is typically considered to be less than or equal to about 100 µm (0.5 mm), while nanoscale is typically less than or equal to about 1 µm (1,000 nm). Thus, conventional mesoscale, microscale, and nanoscale dimensions may be considered to overlap. In certain aspects, the length of each discontinuous cut may be on a microscale, for example, a length that is less than about 100 µm (i.e., 100,000 nm), optionally less than about 50 µm (i.e., 50,000 nm), optionally less than about 10 µm (i.e., 10,000 nm), optionally less than or equal to about 5 µm (i.e., 5,000 nm), and in certain aspects less than or equal to about 1 µm (i.e., 1,000 nm). In certain aspects, the discontinuous cuts 42 may have a length that is less than about 50 µm (i.e., 50,000 nm), optionally less than about 10 µm (i.e., 10,000 nm), and optionally less than about 1 µm (i.e., less than about 1,000 nm).

In certain other variations, these dimensions can be reduced by at least 100 times to a nanoscale, for example a cut having a length of less than or equal to about 1 µm (1,000 nm), optionally less than or equal to about 500 nm, and in certain variations, optionally less than or equal to about 100 nm.

It should be noted that "x" and "L" may vary within rows depending on the pattern formed, although in preferred aspects, these dimensions remain constant.

A second row 234 of second discontinuous cuts 244 is also patterned on the sheet 230. The second discontinuous cuts 244 define a second uncut region 254 therebetween. A third row 236 of third discontinuous cuts 246 is also patterned on the sheet 230. The third discontinuous cuts 246 define a third uncut region 256 therebetween. It should be noted that the first row 232, second row 234, and third row 236 are used for exemplary and nominative purposes, but as can be seen, the tessellated pattern on the surface of sheet 230 has in excess of three distinct rows. The first row 232 is spaced apart from the second row 234, as shown by the designation "y." The second row 234 is likewise spaced apart from the third row 236. It should be noted that "y" may vary between rows, although in certain aspects, it remains constant between rows. Such spacing between rows may likewise be on a micro- meso-, nano- and/or macroscale, as described above.

Notably, the first discontinuous cuts 242 in the first row 232 are offset in a lateral direction (along the dimension/axis shown as "x") from the second discontinuous cuts 244 in the second row 234, thus forming a tessellated pattern. Likewise, the second discontinuous cuts 244 in the second row 234 are offset in a lateral direction from the third discontinuous cuts 246 in the third row 236. Thus, the first uncut region 252, second uncut region 254, and third uncut region 256 in each respective row cooperates to form a structural bridge 260 that extends from the first row 232, across second row 234, and to third row 236.

In this regard, the sheet 230 having the patterned tessellated surface with the plurality of discontinuous cuts (e.g., 242, 244, and 246) can be stretched in at least one direction (e.g., along the dimension/axis shown as "y" or "x"). The sheet 230 formed of a nanocomposite thus exhibits certain advantageous properties, including enhanced strain.

In various aspects, an optic device incorporating a stretchable multilayered polymeric or composite material formed by a kirigami process is contemplated. By "stretchable" it is meant that materials, structures, components, and devices are capable of withstanding strain, without fracturing or other mechanical failure. Stretchable materials are extensible and thus are capable of stretching and/or compression, at least to some degree, without damage, mechanical failure or significant degradation in performance.

"Young's modulus" is a mechanical property referring to a ratio of stress to strain for a given material. Young's modulus may be provided by the expression:

$$E = \frac{(\text{stress})}{(\text{strain})} = \frac{\sigma}{\epsilon} = \frac{L_o}{\Delta L} \times \frac{F}{A}$$

where engineering stress is $\sigma$, tensile strain is $\epsilon$, E is the Young's modulus, $L_o$ is an equilibrium length, $\Delta L$ is a length change under the applied stress, F is the force applied and A is the area over which the force is applied.

In certain aspects, stretchable composite materials, structures, components, and devices may undergo a maximum tensile strain of at least about 50% without fracturing; optionally greater than or equal to about 75% without fracturing, optionally greater than or equal to about 100% without fracturing, optionally greater than or equal to about 150% without fracturing, optionally greater than or equal to about 200% without fracturing, optionally greater than or equal to about 250% without fracturing, optionally greater than or equal to about 300% without fracturing, optionally greater than or equal to about 350% without fracturing, and in certain embodiments, greater than or equal to about 370% without fracturing.

Stretchable materials may also be flexible, in addition to being stretchable, and thus are capable of significant elongation, flexing, bending or other deformation along one or more axes. The term "flexible" can refer to the ability of a material, structure, or component to be deformed (for example, into a curved shape) without undergoing a permanent transformation that introduces significant strain, such as strain indicating a failure point of a material, structure, or component.

Thus, the present disclosure provides in certain aspects, a stretchable polymeric material. In further aspects, the present disclosure provides a stretchable composite material that comprises a polymer and a plurality of nanoparticles or other reinforcement materials. The polymer may be an elastomeric or thermoplastic polymer. One suitable polymer includes polyvinyl alcohol (PVA), by way of non-limiting example.

For example, for certain materials, creating the surface having patterned kirigami cuts in accordance with certain aspects of the present disclosure can increase ultimate strain of initially rigid sheets to greater than or equal to about 100% from an initial ultimate strain prior to any cutting, optionally greater than or equal to about 500%, optionally greater than or equal to about 1,000%, and in certain variations, optionally greater than or equal to about 9,000%.

Notably, a wide range of maximum attainable strains or expansion levels can be achieved based on the geometry of the cut pattern used. The ultimate strain is thus determined by the geometry. The ultimate strain (% strain) is a ratio between a final achievable length, while being stretched to a point before the structure breaks, over the original or initial length ($L_i$):

$$\% \text{ strain} = \frac{\Delta L}{L_i} = \frac{L_c - x - 2y}{2y}$$

where $L_c$ is a length of the cut, x is spacing between discontinuous cuts, and y is distance between discrete rows of discontinuous cuts. Thus, in certain variations, the polymeric materials, such as nanocomposites, having a surface with patterned cuts in accordance with certain aspects of the present disclosure can increase ultimate strain to greater than or equal to about 100%, optionally greater than or equal to about 150%, optionally greater than or equal to about 200%, optionally greater than or equal to about 250%, optionally greater than or equal to about 300%, optionally greater than or equal to about 350%, and in certain variations, optionally greater than or equal to about 370%. Additional discussion on kirigami composite materials and methods of making them are described in U.S. Publication No. 2016/0299270 filed as U.S. application Ser. No. 15/092,885 filed on Apr. 7, 2016 to Kotov et al. entitled "Kirigami Patterned Polymeric Materials and Tunable Optic Devices Made Therefrom," the relevant portions of which are incorporated herein by reference.

In certain aspects, the kirigami nanocomposites can form tunable optical grating structures that can maintain stable periodicity over macroscopic length scale even under 100% stretching. The lateral spacing in diffraction patterns shows negative correlation with the amount of stretch, which is consistent with the reciprocal relationship between the dimensions in diffraction pattern and the spacing of the corresponding grating. The longitudinal spacing in the diffraction patterns exhibits less dependency on the amount of stretch, owing to the relatively small changes in longitudinal periodicity with lateral stretch. The diffraction patterns also show significant dependence on the wavelength of the incoming laser. The polymeric stretchable tunable optic grating structures present elastic behavior with the stretch and spontaneously recovers to the relaxed (i.e., un-stretched) geometry as the stretch is removed under cyclic mechanical actuation. The diffracted beams form clear patterns that change consistently with the deformation of the polymeric stretchable tunable optic grating structures. This behavior indicates excellent capability for dynamic, wavelength-dependent beam steering.

Figure 2B:
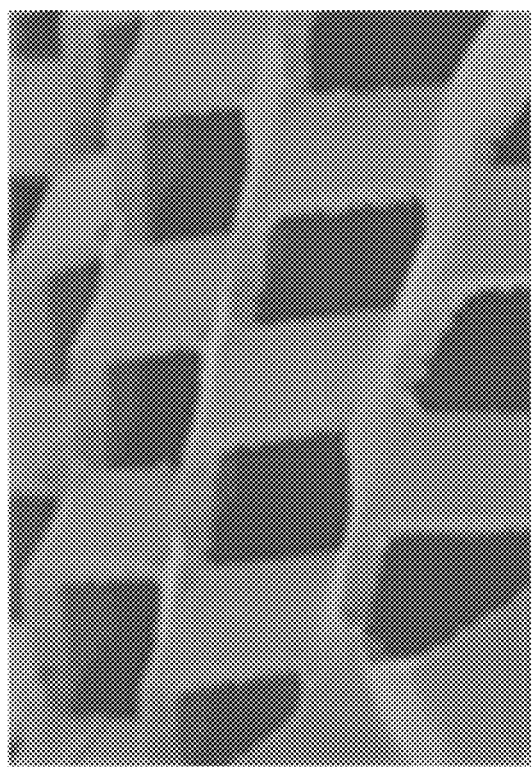
FIGS. 2a-2b are scanning electron microscope (SEM) images of nano-kirigami nanocomposite sheets configured for use in a M-LIDAR system according to certain aspects of the present disclosure.
Figure 2A:
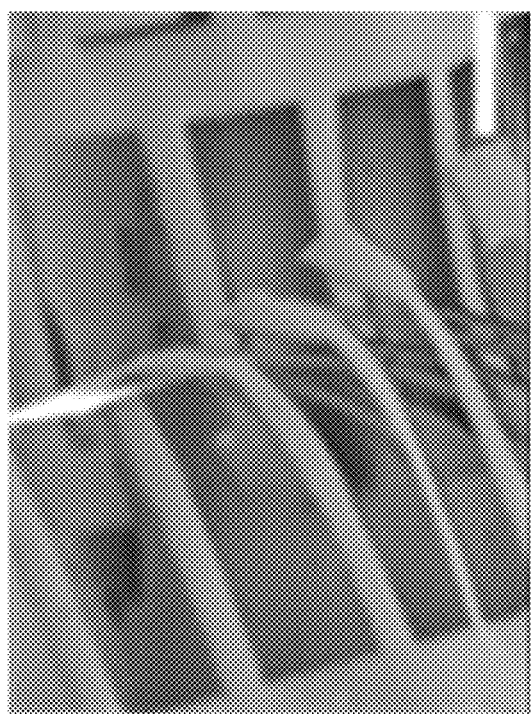

Three-dimensional (3D) kirigami nanocomposites thus provide a new dimension to traditional reflective and refractive optics due to the out-of-plane surface features, as illustrated in FIGS. 2a-2b. For example, the reconfigurable fins and slits formed by the cuts illustrated in the nano-kirigami sheets shown in FIGS. 2a-2b allow for efficient modulation of light by reversible expansion (or strain levels) of the kirigami cut sheets. Consequently, nano-kirigami sheets such as those shown in FIGS. 2a-2b may be incorporated into one or more optic components of the M-LIDAR system described here. More specifically, these light, thin and inexpensive optical components may be used, for example, for the red and infrared portions of the light spectrum to achieve beam steering and/or polarization modulation. According to some implementations, kirigami nanocomposites of the type shown in FIGS. 2a-2b may be utilized to form the beam steer 106, s-polarization linear polarizer 114, and/or p-polarization linear polarizer 116 of the system illustrated in FIG. 1.

In certain variations, kirigami nanocomposites can form kirigami optical modules manufactured from ultrastrong layer-by-layer (LbL) assembled nanocomposites (Kotov, N. A. et al., "Ultrathin graphite oxide-polyelectrolyte composites prepared by self-assembly: Transition between conductive and non-conductive states," *Adv. Mater.*, 8, 637-641 (1996) and Kotov, N. A. et al., "Layer-by-Layer Self-assembly of Polyelectrolyte-Semiconductor Nanoparticle Composite Films," *J. Phys. Chem.*, 99, 13065-13069 (1995)). These nanocomposite materials having high strength, for example, about 650 MPa and an elastic modulus (E) of about 350 GPa, for example, providing exceptional mechanical properties, environmental robustness, along with a wide temperature range of operations (e.g., from −40° to +40° C.), and proven scalability. High elasticity of LbL composites makes them reconfigurable and their high temperature resilience enables integration with different types of actuators and CMOS compatibility. In certain aspects, the nanocomposite material may be coated with plasmonic films such as titanium nitride, gold, and the like to enhance interaction with target wavelengths of photons, for example, 1550 nm photons where the laser source has a wavelength of 1550 nm.

In certain other variations, the kirigami nanocomposite sheets can include magnetic materials distributed therein or coated thereon. For example, a layer of nickel may be deposited on an ultra-strong composite. The layer of nickel can serve as a magnetic and reflective layer, thus providing a magentoactive kirigami element. The kirigami units thus can be directly integrated with LIDAR components and serve as beam steerers (for example, using first and second order diffraction beams) or as polarizers (for example, using the first order diffraction beams).

Figure 3A:
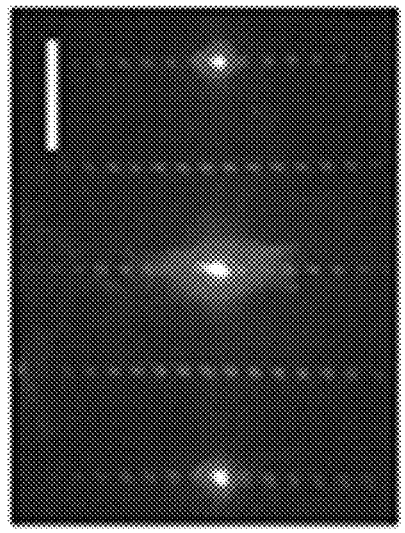
FIGS. 3a-3c are images depicting laser diffraction patterns from nano-kirigami-based graphene composites for various strain levels (0% in FIG. 3a, 50% in FIG. 3b, and 100% in FIG. 3c) according to certain aspects of the present disclosure.
Figure 3B:
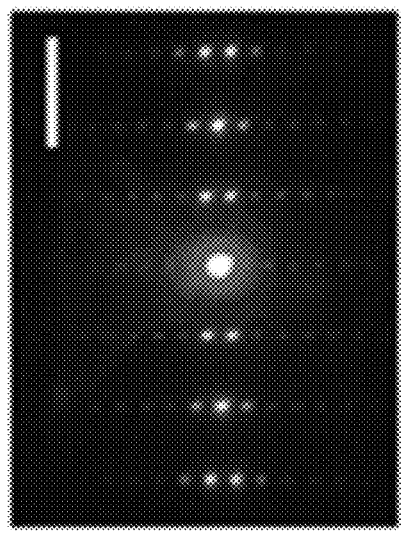
Figure 3C:
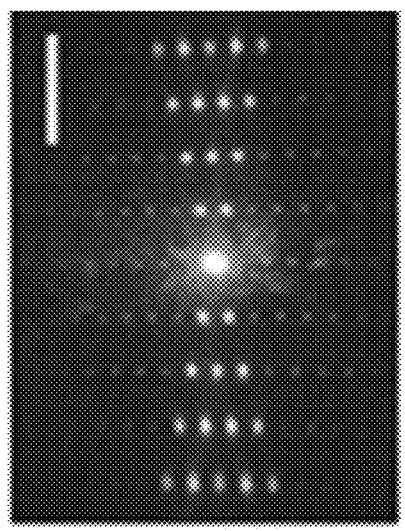

Referring now to FIGS. 3a-3c, images depicting laser diffraction patterns from nano-kirigami-based graphene composites are shown. For reference, the scale bars shown in the upper right hand corners of FIGS. 3a-3c represent 25 mm. FIG. 3a depicts the laser diffraction pattern for nano-kirigami-based graphene composites for 0% strain (relaxed state). FIG. 3b depicts the laser diffraction pattern for from nano-kirigami-based graphene composites for 50% strain. Finally, FIG. 3c depicts the laser diffraction pattern for from nano-kirigami-based graphene composites for 100% strain.

Polarization modulation of LIDAR beams and polarization analysis of returned photons will enable the acquisition of information about the object material that is currently lacking in, for example, car safety and robot vision devices. Machine Learning (ML) algorithms may be trained to recognize different materials and MST classification based on their unique polarization signatures may be achieved. The MST classification of objects by material may, among other advantages, accelerate object recognition and improve the accuracy of machine perception of surroundings.

Before turning to the specifics of FIGS. 4a-4d, it bears noting that system 100 of FIG. 1 and corresponding methods of material detection and object classification may be carried out, according to some examples of the present disclosure, utilizing non-nano-kirigami optical elements. Indeed, such non-nano-kirigami optical element-based M-LIDAR systems may be preferred for certain applications (e.g., where size and weight are not major concerns). Accordingly, implementations of the presently disclosed M-LIDAR system in which nano-kirigami optical elements are not utilized, other traditional optical components such as (i) IR polarizers; (ii) beam splitters; (iii) lenses made from CdS, ZnS, silicon; and/or (iv) similarly suitable optical elements may be equally employed without deviating from the teachings herein. However, nano-kirigami optical elements are generally favored for M-LIDAR systems that benefit from being light and small.

With that as a backdrop, FIGS. 4a-4d illustrate a step-by-step lithographic-type process for manufacturing a nano-kirigami-based optical element, such as a beam splitter or linear polarizer. According to one example, the process for manufacturing the nano-kirigami-based optical element set forth in FIGS. 4a-4d may include using a vacuum assisted filtration (VAF), whereby nanocomposite material may be deposited as a layer on a stiff (e.g., plastic) substrate suitable for lithographic patterning. As noted above, U.S. Publication No. 2016/0299270 describes methods of making such nanocomposite materials, including by vacuum assisted filtration (VAF) and layer-by-layer (LBL) deposition process techniques. Nanocomposites manufactured according to this process are known to display high toughness and strong light absorption.

FIG. 4a. is a simplified illustration of the first step of the process 400 whereby a nanocomposite layer 404a is deposited on a substrate 402 via VAF, layer-by-layer deposition (LBL), or any other suitable deposition method known in the art. FIG. 4b illustrates the second step in the process 400 after the nanocomposite 404a of FIG. 4 has been patterned to produce a patterned kirigami nanocomposite 404b through select regions of the nanocomposite layer 404a, for example, via a photolithographic cutting process, atop the substrate 402. FIG. 4c illustrates the third step in the process 400 whereby the cut or patterned kirigami nanocomposite 404b is released (e.g., lifted) from the substrate 402. Finally, FIG. 4d illustrates the final step of the process 400 whereby at least a portion of the patterned kirigami nanocomposite 408 has been incorporated into a subassembly configured for, among other things, beam steering and/or modulation.

The subassembly shown in FIG. 4d includes the patterned kirigami nanocomposite portion 408, a microfabricated silicon layer 406 housing, and one or more bent beam actuators 410. Dual sided arrows 412 illustrate the potential directions of the actuator 410 motions. As discussed in additional detail below, the bent beam actuators 410 may be configured to exert reversible strain on the kirigami nanocomposite portion 408 so as to, for example, adjust the size and/or orientation of various slits and/or fins making up the pattern of the kirigami nanocomposite portion 408. Thus, the kirigami nanocomposite portion 408 may thus be reversibly stretched at strain levels ranging from 0% to 100%.

A more detailed discussion of the patterning aspect of the process 400 shown in FIGS. 4a-4d follows. The manufacturing of the kirigami transmissive optical modules may follow the step-by-step diagram shown in FIGS. 4a-4d. The modulation of LIDAR laser beams in visible and IR ranges may require feature sizes at, for example, 3 µm, created over 0.1-1 cm widths. The feasibility of such patterns has already been demonstrated. The 2D geometry of the patterns may be selected based on computer simulations of their 2D to 3D reconfiguration when stretched or strained. The 3D geometry may be modeled for optical properties, for instance, polarization modulation in the desirable wavelength range. Photolithography may be a primary patterning tool, enabled by the chemistry of VAF composites described above. The patterning protocol may be substantially similar to that currently being used for large scale microfabrication. For example, VAF composites on glass substrates may be coated by standard SU8 photoresist following photo patterning using commercial conventional mask aligner. Examples of kirigami patterns prepared are shown in FIGS. 5a-5c, discussed in greater detail below.

Kirigami optical elements may be manufactured by integrating kirigami nanocomposite sheets with commercial microelectromechanical actuators as show, for example, in FIG. 4d. The microelectromechanical systems (MEMS) kirigami units may be directly integrated with LIDAR components and serve as beam steerers (using, for example, first and second order diffraction beams) and/or polarizers (using, for example, the first order diffraction beams). Considering the nearly endless number of kirigami patterns and wide variety of 2D to 3D reconfigurations, kirigami optical elements with both beam steering and polarization capabilities, as well as other optical functions, are contemplated within the teachings herein.

With brief reference to FIGS. 5a-5c, various images of example kirigami optical elements are shown. For example, FIG. 5a is an image of a kirigami optical element, such as the kirigami optical elements described herein, fabricated on a wafer in line with the process 400 described above with regard to FIGS. 4a-4d. FIG. 5b is a SEM image of the kirigami optical element of FIG. 5a under 0% strain. Finally, FIG. 5c is a SEM image of the kirigami optical element of FIG. 5a under 100% strain. The scale bars depicted in the upper right hand corners of FIGS. 5b-5c are 50 µm.

Photolithographic techniques can be used to manufacture kirigami transmissive or reflective optical modules/elements. By way of example, modulation of LIDAR laser beams having a wavelength of about 1550 nm may have feature sizes from greater than or equal to about 1 µm to less than or equal to about 2 µm, created over widths ranging from greater than or equal to about 0.1 cm to less than or equal to about 1 cm exemplified by the current patterns in FIGS. 5a-5c. The two dimensional (2D) geometry of the patterns can be selected based on computer simulations of their 2D to three dimensional (3D) reconfiguration when stretched. The 3D geometry can be modeled for optical properties, for instance, polarization modulation in the desirable wavelength range.

Photolithography is a primary patterning technique that can be used in combination with LbL composites to form kirigami optical elements. In one example, the patterning protocol can include providing an LbL composite on a glass substrate that is coated by a standard SU-8 photoresist following photo patterning using a commercial mask aligner (UM Lurie Nanofabrication Facility, LNF). Such a process can form kirigami elements like those shown in FIGS. 5a-5c.

Another representative simplified compact M-LIDAR system 300 for use in a vehicle, such as an autonomous vehicle, is provided in FIG. 11. To the extent that the components in the M-LIDAR system 300 are similar to those in the M-LIDAR system 100 of FIG. 1, for brevity, their function will not be repeated herein. The M-LIDAR system 300 may include a laser 310, a beam steerer 312, one or more polarizers (not shown, but similar to the first polarizer 114 and second polarizer 116 described in the context of FIG. 1), and a processor (not shown, but similar to processor 126 that shown in FIG. 1). In the M-LIDAR system 300, a pulse generator 312 is connected to laser 310 and generates a polarized or unpolarized first light pulse 314 and a polarized or unpolarized second light pulse 316. The pulse generator 312 is connected to an oscilloscope 324. The first light pulse 314 and second light pulse 316 generated by laser 310 are directed towards a beam steerer 318, which may in certain aspects, be a kirigami-based beam steerer like those discussed previously above. The beam steerer 318 is connected to and controlled by a servo-motor/Arduino 352. The servo-motor/Arduino 352 is connected to a controller 350 that may be a MATLAB™ control, by way of non-limiting example. As noted previously above, the beam steerer 318 may polarize, modify, split, and/or modulate one or both of the first light pulse 314 and second light pulse 316 by way of non-limiting example, as discussed previously above. The first light pulse 314 and second light pulse 316 are then directed towards an object 340 to be detected.

The first light pulse 314 and second light pulse 316 may be diffusively reflected off the object 110. One or more pulses of light collectively form a first reflected beam 342 and a second reflected beam 344 that constitutes a reflected version of the first light pulse 314 and second light pulse 316. According to some examples, the first reflected beam 342 and the second reflected beam 344 may have a different polarization than the first light pulse 314 and second light pulse 316 (i.e., prior to reflection off of the object 340). After reflecting from the object 340, the first reflected beam 342 and second reflected beam 344 may be directed towards an off-axis parabolic reflector/mirror 330 that redirects the first reflected beam 342 and second reflected beam 344 towards a beam splitter 360.

The first reflected beam 342 is thus split and directed to both a first detector 362 and a second detector 364. The first detector 362 and the second detector 364 may be connected to the oscilloscope 324. The first detector 362 may be an s-polarization detector configured to detect an intensity of one or more reflected s-polarization light pulses forming the first reflected light beam 342. Likewise, the second detector 364 may be a p-polarization detector configured to detect an intensity of one or more reflected p-polarization light pulses forming the first reflected light beam 342. After passing through beam splitter 360, the second reflected light beam 344 is directed to both the first detector 362 and the second detector 364, where an intensity of the s-polarization light pulses and/or p-polarization light pulses can be detected from the second reflected light beam 344. The first detector 362 and the second detector 364 may be connected to a processor (not shown), which further analyzes information received therefrom as described previously above. The M-LIDAR system 300 is compact and may have dimensions of about 7 inches by 12 inches, by way of non-limiting example, making it particularly suitable to mount in a vehicle.

MST classification, as introduced above, may be realized according to examples of the present disclosure through the use of light source-based MST classification with light polarization classifiers added to point clouds. In one example, for each 3D range measurement of a point cloud, linear/circular polarization of returned photons may be acquired. In addition, local curvature and local scattering conditions may be made directly based on the polarization state of the returned photons, although the relationship between surface properties and polarization state may, in some instances, be noisy due to surface roughness.

Referring now to FIG. 6, MST polarization analysis of reflected laser light was performed using AI data processing with a neural network algorithm to produce the confusion matrix of FIG. 6. More specifically, the confusion matrix was produced based on analysis of s and p-polarized light beams (such as the s and p-polarized light beams 118, 120 shown in FIG. 1). Along the x-axis, predicted types of materials for a test object subjected to the M-LIDAR system and processing methods described herein are identified. Along the y axis, the true types of materials for the test object are identified. The accuracy of various predictions of the AI algorithm for the various material types are reflected at the intersections of the predicted material types and true material types. As shown, the materials detection functionality of the M-LIDAR system may be accomplished with a high degree of accuracy (including at or above 99% in some instances) using these polarized light beams.

Referring now to FIG. 7, a confusion matrix for the detection of simulated black ice compared to other materials is shown. Again, the materials detection functionality of the M-LIDAR system may be accomplished with a high degree of accuracy (including at 100% in some instances).

FIG. 8 illustrates one example of an M-LIDAR device 800 for use in, for example, black ice detection (e.g., when installed in a vehicle or the like). While the present example focuses on a black-ice detection application, those having ordinary skill will recognize that the device 800 is not limited to black ice detection, and may be suitably employed for a wide range of material detection and object classification applications, including on autonomous vehicles. The device 800 includes a housing 802, an emitter 804 (i.e., an emitter for emitting light pulses making up a laser light beam), a first detection 806a, and a second detector 806b. According to one example, one or more of the detectors 806a, 806b include orthogonal polarization analyzers. Furthermore, according to one example, one or more of the emitter 804, detector 806a, and/or detector 806b may be made with kirigami optical elements. Although the primary example of the device is use within an automobile, the device could also be used, for example, within an aircraft, such as a drone or the like.

Referring now to FIG. 9, a flowchart illustrating a method 900 of performing object classification using an M-LIDAR system is provided. The method 900 begins at 902 where an unpolarized light pulse is generated. At 904, the unpolarized light pulse is linearly polarized to produce a linearly polarized light pulse. The linearly polarized light pulse may be emitted towards an object and reflect back off of the object to produce a reflected linearly polarized light pulse. At 906, the reflected linearly polarized light pulse may be linearly polarized for s-polarization to produce a reflected s-polarization light pulse.

At 908, the reflected linearly polarized light pulse may be linearly polarized for p-polarization to produce a reflected p-polarization light pulse. At 910, an intensity of the reflected s-polarization light pulse may be detected. At 912, an intensity of the reflected p-polarization light pulse may be detected. At 914, at least one material of the object may be detected based on the intensity of the reflected s-polarization light pulse and the intensity of the reflected p-polarization light pulse. Finally, at 916, the object may be classified based on the detected at least one material. Following 916, the method 900 concludes.

Finally, according to some examples, kirigami patterns may be used as MST tags for the polarization-based detection of objects. Mass-produced kirigami components can also be added to paints to impart a specific polarization response in road signs, clothing, markers, vehicles, household items, or any other suitable objects.

In certain variations, LIDAR systems of the present disclosure can provide modulation of transmitted and reflected beams. Kirigami-based optical elements can be added to an emitter side of the LIDAR to serve as beam steerers, which can thus replace conventional bulky rotational or liquid crystal phase array beam steerers. Magnetic actuation modules can be integrated with a 1550 nm laser source. To reduce the bulk of the beam steerer, fiber optics can be coupled directly with the module.

In certain variations, LIDAR systems provided by the present disclosure may provide enhanced detection in precipitation and/or humid atmospheric conditions. For example, the LIDAR systems contemplated by the present disclosure may be particularly suitable for use in low visibility conditions by employing a laser with a wavelength of about 1550 nm, by way of non-limiting example, which provides enhanced detection and performance during poor weather conditions, including low visibility conditions that accompany fog, rain, and snow. Such LIDAR systems can enable long-range warnings, for example, up to 200 meters, which is especially useful for highway driving conditions. Conventional LIDARs use laser with wavelengths of about 900 nm, which is convenient for silicon-based detectors. However, these conventional laser beams experience relatively strong scattering in humid atmospheric conditions. LIDARs operating with 1550 nm can utilize high transparency of humid air, which is advantageous for all different levels of autonomy from proximity warnings to assisted driving and full autonomous ride modality. However, such LIDARs can be bulky and expensive due to high weight and cost of near-infra-red optics. In accordance with certain aspects of the present disclosure, kirigami-based optic elements can resolve this issue by taking advantage of the space-charge and subwavelength effects possible for the patterned kirigami sheets, see for example, FIGS. 2a-2b. As shown in FIGS. 3a-3b, such kirigami sheets can effectively modulate and beam steer near-infrared light lasers using the reconfigurable out-of-plane patterns of the kirigami sheets. A 1550 nm beam steering device incorporating such kirigami-based optical elements can be used as thin, light, and inexpensive solid-state LIDAR. Furthermore, the versatility of kirigami technology allows one to potentially adapt patterns for specific applications, for example, customizing the LIDAR system to specific vehicles and/or to adapt it to surfaces of different curvature of automotive parts.

In certain aspects, the present disclosure can provide LIDAR systems with relatively fast detection, by using two-stage object proposal and detection methods without sacrificing accuracy for latency. For example, improved model accuracy and generalizability for classification models can include enhancing static object classifiers by adding a material dimension to data. Objects with material fingerprints that contain plastic, wood and brick are very unlikely to move, while those with metal or fabric fingerprints are more likely be pedestrians and vehicles. Moreover, as the material dimension is more robust to scenario variations, these models generalize better to rare and complicated cases, such as construction sites and streets with complex festival decorations. Thus, material fingerprints greatly enhance model accuracy for point cloud association models with impact on tracking and autonomous vehicle maps. For example, the material dimension of the point clouds can make the detection and classification much more reliable, as pedestrians walking with bicycles can be picked up as point clouds, with metal materials on the lower side with some fabric or skin features from the pedestrian. It is then much easier for the self-driving systems to discern it from a pure pedestrian. Also, the material fingerprints of the object make it easier for the system to associate the point clouds with the correct object classification, helping to maintain the correct and consistent composite-object classification.

The present disclosure thus provides inexpensive and compact LIDAR systems with enhanced object recognition, including an ability to distinguish material types, provide earlier detection and warning systems, including an ability to identify an object within milliseconds, and high efficacy in low visibility conditions, among other benefits.

In certain variations, the present disclosure provides a system comprising a laser configured to generate a light pulse, a beam steerer configured to produce a polarization-adjusted light pulse emitted towards an object, at least one polarizer configured to polarize reflected, scattered, or emitted light returned from the object, and a processor configured to detect at least one material of the object based on an intensity and polarization of the polarized reflected, scattered or emitted light from the object. In one aspect, the beam steerer comprises a kirigami nanocomposite. In one aspect, the at least one polarizer comprises a kirigami nanocomposite. In one aspect, the processor is further configured to classify the object based on the detected at least one material of the object.

In a further aspect, the processor is configured to classify the object based on the detected at least one material of the object by applying a machine-learning algorithm. In a further aspect, the machine-learning algorithm comprises an artificial neural network algorithm.

In one aspect, the beam steerer is configured to adjust a polarization of the light pulse to produce the polarization-adjusted light pulse. In one aspect, the beam steerer is configured to adjust a polarization of the light pulse by at least one of imparting a polarization to an unpolarized light pulse and changing a polarization of a polarized light pulse. In another aspect, the beam steerer is configured to adjust a polarization of the light pulse by applying at least one of the following types of polarization: linear polarization, circular polarization, and elliptical polarization. In a further aspect, applying linear polarization comprises applying at least one of s-type linear polarization and p-type linear polarization.

In one aspect, the at least one polarizer is configured to polarize the reflected, scattered, or emitted light returned from the object by applying at least one of the following types of polarization: linear polarization, circular polarization, and elliptical polarization. In a further aspect, the applying is applying linear polarization that comprises applying at least one of s-type linear polarization and p-type linear polarization. In one aspect, the at least one polarizer comprises a plurality of polarizers.

In one aspect, the system further comprises at least one polarization detector connected to the at least one polarizer and the processor, wherein the at least one polarization detector is configured to detect the intensity of the polarized reflected, scattered or emitted light from the object. In a further aspect, the at least one polarization detector comprises a plurality of polarization detectors. In a further aspect, the at least one polarization detector is configured to detect an angle of incidence associated with the polarized reflected, scattered or emitted light from the object.

In a further aspect, the processor is further configured to detect the at least one material of the object based on the angle of incidence associated with the polarized reflected, scattered or emitted light from the object.

In yet other variations, the present disclosure provides a method comprising generating a light pulse, adjusting a polarization of the light pulse to produce a polarization-adjusted light pulse emitted towards an object, polarizing reflected, scattered, or emitted light returned from the object, and detecting at least one material of the object based on an intensity and polarization of the polarized reflected, scattered or emitted light from the object.

In one aspect, adjusting the polarization of the light pulse is performed by a beam steerer comprising a kirigami nanocomposite. In one aspect, the kirigami nanocomposite is manufactured via a vacuum-assisted filtration (VAF) process. In one aspect, the kirigami nanocomposite is manufactured via a layer-by-layer (LBL) deposition process. In one aspect, the method further comprises classifying the object based on the detected at least one material of the object.

In one aspect, classifying the object comprises classifying the object by applying a machine-learning algorithm. In one aspect, the machine-learning algorithm comprises an artificial neural network algorithm.

In other aspects, the present disclosure provides LIDAR systems and methods configured to detect an object's relative distance or location and shape along with additional information about the object, such as the material composition of the object, and/or additional information about the returned beam of laser pulses, such as optical characteristics about the reflected beam. The additional information about the beam returned from the object can include, for example, polarization information, Raman scattering information, circular dichroism information, etc. In this way, the additional information about the object and/or about the returned/ reflected beams adds an additional dimension of information that is stored and associated with the distance or location and shape information about the object. In other words, the LIDAR systems and methods of the present disclosure are multidimensional in the sense that the systems and methods are configured to detect information in addition to the three-dimensional information representing an object's relative distance or location and shape. For example, the material composition of the object can add a fourth dimension to the information associated with the object. Additionally or alternatively, the additional information about the beam returned from the object may include polarization information, Raman scattering information, circular dichroism information, and the like, which can add one or more additional dimensions to the information associated with the object.

For example, an object detected by the LIDAR systems and methods of the present disclosure can be represented by a point cloud in a three-dimensional XYZ coordinate system. The point cloud can include a plurality of points, with each point representing a location on the surface of the object and having associated XYZ coordinates. As discussed in further detail above, generating a point cloud can include a process of repeatedly emitting pulses of light, the pulses diffusely reflecting off of the object, the reflected light being measured by the detectors, and determining the location of a point on the surface of the object relative to the source of the light. This process can then be repeated multiple times per second, such as on the order of millions of times per second, with a point being generated each time. The various points are then mapped onto the same XYZ coordinate system to create the point cloud.

For each point in the point cloud representing the object, the LIDAR systems and methods of the present disclosure can also determine a fourth dimension representing the composition of the material located at that particular point on the surface of the object. Additionally or alternatively, for each point in the point cloud representing the object, the LIDAR systems and methods of the present disclosure can also determine additional dimensions corresponding to the additional information about the returned (e.g., reflected) beam of laser pulses associated with that particular point on the surface of the object, such as optical characteristics about the reflected beam. As noted above, the additional information can include, for example, polarization information, Raman scattering information, circular dichroism information, etc., about the returned (e.g., reflected) beam associated with that particular point on the surface of the object. In this way, the LIDAR systems and methods of the present disclosure can also determine a multidimensional point cloud representing a detected object that includes XYZ coordinates for points representing the surface of the object, with each point having, in addition to an XYZ coordinate, additional associated information, such as information representing the material composition of the surface of the object at that particular point and/or additional information about the reflected beam from that particular point, such as polarization information, Raman scattering information, circular dichroism information, etc., As discussed above, the material classification methods of the present disclosure can determine the material composition information from the optical information about the reflected beam, such as the polarization information, Raman scattering information, circular dichroism information, etc. In this way, the LIDAR systems and methods of the present disclosure can generate and store any combination of the material composition information and/or the additional optical information associated with each point in the point cloud representing the detected object.

With reference to FIG. 12, a four-dimensional point cloud 1000 generated by the LIDAR systems and methods of the present disclosure is shown using a person on a bicycle as the example object detected. While only the X and Y axes of the XYZ coordinate system are shown in FIG. 12, it is understood that the point cloud 1000 is three dimensional with the Z axis being omitted for ease of illustration. The point cloud 1000 includes a plurality of points with each point representing a location on the detected object, for example, a location on a surface of the detected object, in this case being the person on the bicycle. As further illustrated in FIG. 12, each XYZ point in the point cloud 1000 also includes associated material composition information. As shown by the key 1002, the points 1004 of the point cloud 1000 corresponding to the head of the person are indicated as having material composition information corresponding to skin. The points 1006 of the point cloud 1000 corresponding to the torso, arms, and legs of the person are indicated as having material composition information corresponding to cotton. The points 1008 of the point cloud 1000 corresponding to the frame of the bicycle are indicated as having material composition information corresponding to aluminum. The points 1010 of the point cloud 1000 corresponding to the tires of the bicycle are indicated as having material composition information corresponding to rubber. The point cloud 1000 illustrated in FIG. 12 could be used, for example, by an autonomous vehicle system. For example, the autonomous vehicle system could use the point cloud 1000 illustrated in FIG. 12 to determine that the detected object is a person riding a bicycle. The autonomous vehicle system could also use the point cloud 1000 to differentiate the object as an actual person riding a bicycle from, for example, a statute of a person riding a bicycle.

While the Example point cloud 1000 includes material composition information as the fourth dimension associated with each point of the point cloud, as noted above, other additional information about the reflected beam could be stored with each point in addition to or in place of the material composition information. The additional information could include, for example, polarization information, Raman scattering information, circular dichroism information, etc.

The LIDAR systems and methods of the present disclosure can generate and utilize a materials database that stores material composition information with corresponding optical information, such as polarization information, Raman scattering information, circular dichroism information, etc., In this way, the LIDAR systems and methods of the present disclosure can compare the optical information associated with a reflected beam from an object with the stored optical information to look up and determine the corresponding material composition for the object. The LIDAR systems and methods of the present disclosure can use a neural network and machine learning techniques to generate and build the materials database and to calibrate associated parameters used in determining material composition of an object based on the optical information associated with the reflected beam from the object.

For example, the neural network can be initialized using a neural network layer that includes parameter values based on the physical laws of light/matter interaction. In other words, the neural network layer can be initialized to provide the expected material composition for an object using the inputted optical information associated with the reflected beam from the object based on the physical laws of light/matter interaction. The system can then be trained using a large number of objects (such as thousands, millions, or billions of objects) each having a known composition. For example, the LIDAR system can scan each object, compare the determined material composition with the known composition of the object, and adjust the parameter values of the neural network based on the comparison using machine learning techniques. This process can be repeated multiple times for each object in the large number, with each iteration resulting in higher accuracy for the determined material compositions as the system calibrates and adjusts the parameter values of the neural network over time. Because the optical information associated with the reflected beam can depend on the orientation, position, and shape of the object, the objects can be rescanned multiple times using different orientations and positions to increase the accuracy of the system. Further, as discussed in further detail below, the system can include multiple LIDAR lasers and detectors positioned at different orientations relative to the object and information from each of the multiple LIDAR lasers and detects can be used in parallel to determine the material composition of the object and increase the accuracy of the system.

With reference to FIG. 13, a flowchart illustrating a method 1100 of training a neural network used to identify material composition of objects, including individual points on the surface of the objects, in accordance with the present disclosure is provided. The method 1100 begins at 1102. At 1104, the neural network is initialized based on the physical laws of light/matter interaction. For example, initialize parameters of the neural network are initialized and set based on the physical laws of light/matter interaction. At 1106, an object having a predetermined or known material composition is detected using the LIDAR system and a material composition for each point of the point cloud representing the object is determined based on the optical information of the returned (e.g., reflected) beam and based on the neural network.

At 1108, the material composition determined by the system is compared with the known material composition of the object. At 1110, the parameters of the neural network are adjusted, if needed, based on the comparison using machine learning techniques.

At 1112, a determination is made as to whether the accuracy of the system is acceptable yet. At 1112, when the accuracy of the system is not yet acceptable, the method loops back to 1106 and repeats the process by detecting another object and making further adjustments to the parameters. The process repeats until the accuracy of the system is determined to be acceptable at 1112. When the accuracy of the system is determined to be acceptable, the process ends at 1114. The accuracy of the system, for example, can be determined to be acceptable when the system accurately determines the material composition of a predetermined number of objects within a predetermined acceptable margin of error.

In this way, by scanning a large number of objects (such as thousands, millions, or billions of objects) the systems and methods of the present disclosure can build up a large database of materials and an associated neural network that can be used to accurately determine the material composition of objects detected with the LIDAR systems of the present disclosure.

The multidimensional LIDAR systems and methods of the present disclosure can be used in recycling systems to identify the material composition of objects to be recycled and to sort the objects appropriately based on the determined material composition. With reference to FIG. 14, an example recycling system 1200 is shown and includes a conveyor belt 1202. The conveyor belt 1202 moves objects from a recycle objects bin 1204 holding objects to be sorted and recycled to a sorter 1206. In the example of FIG. 14, a metal can 1220 is shown on the conveyor belt 1202 as it moves from the recycle objects bin 1204 towards the sorter. As shown in FIG. 14, as the object 1220 is carried on the conveyor belt towards the sorter 1206, the object 1220 is scanned by one or more LIDAR systems 1214a, 1214b, 1214c in accordance with the present disclosure. Although three LIDAR systems 1214a, 1214b, 1214c are shown in FIG. 14, any number of LIDAR systems can be used. For example, only one LIDAR system could be used. As discussed above, however, the use of additional LIDAR systems that can scan the object 1220 from multiple different angles and perspectives can increase the accuracy of the material classification determination.

The recycling system 1200 includes a control module 1218 in communication with the LIDAR systems 1214a, 1214b, 1214c, the sorter 1206, and a materials database 1216. As the object 1220 passes the LIDAR systems 1214a, 1214b, 1214c, the object 1220 is scanned by the LIDAR systems 1214a, 1214b, 1214c, which then communicate the resulting information about the reflected beam from the object 1220 to the control module 1218. In accordance with the classification techniques above, the control module 1218 is configured to access the materials database 1216 and determine a multidimensional point cloud for the object 1220 based on optical information of the reflected beams received by each of the LIDAR systems 1214a, 1214b, 1214c. The multidimensional point cloud, for example, can include material classification information for each point of the point cloud representing the object 1220. Based on the material classification information, the control module 1218 can then control the sorter 1206 to sort the object 1220 into the appropriate classification bin for recycling.

For example, as shown in FIG. 14, the recycling system 1200 includes a glass bin 1208 for receiving glass objects, a metals bin 1210 for receiving metal objects, and a plastics bin 1212 for receiving plastic objects. The sorter 1206 can include baffles, doors, slots, and/or levers that are movable and configurable to direct the object 1220 into the appropriate bin through, for example, chutes 1209, 1211, and 1213. For example, chute 1209 leads to the glass bin 1208, chute 1211 leads to the metals bin 1210, and chute 1213 leads to the plastics bin 1212. While the sorter 1206, recycling bins 1208, 1210, 1212, and chutes 1209, 1211, 1213 are illustrated as examples, any other sorting mechanism can be used and controlled by the control module 1218 to sort objects from the conveyor belt 1202 into applicable recycling bins based on the material composition of the objects, as determined based on the systems and methods of the present disclosure.

In this way, the LIDAR systems and methods of the present disclosure can accurately determine the material composition of objects to be recycled and can be used in conjunction with a sorting system to appropriately and automatically sort objects to be recycled into recycling material groups.

With reference to FIG. 15, four-dimensional point clouds 1300, 1302, 1304 generated by the LIDAR systems and methods of the present disclosure are shown for recycling objects. While only the X and Y axes of the XYZ coordinate system are shown in FIG. 15, it is understood that the point clouds 1300, 1302, 1304 are three dimensional with the Z axis being omitted for ease of illustration. The point clouds 1300, 1302, 1304 each include a plurality of points with each point representing a location on the surface of the detected object. As further illustrated in FIG. 15, each XYZ point in the point clouds 1300, 1302, 1304 also includes associated material composition information. As shown by the key 1306, the points of the point cloud 1300 are indicated as having material composition information corresponding to plastics. The points of the point cloud 1302 are indicated as having material composition information corresponding to aluminum. The points of the point cloud 1304 are indicated as having material composition information corresponding to paper. The point clouds 1300, 1302, 1304 can be generated, for example, by the control module 1218 of the recycling system shown in FIG. 14.

The LIDAR systems and other methods of the present disclosure can also be utilized for detection of a health status of a live object, such as an organism like an animal. The animal may be a human in certain aspects.

The LIDAR systems and other methods of the present disclosure can also be used in medical/cosmetic applications to identify, for example, areas of the skin that exhibit certain conditions and for diagnosis of skin diseases by mapping the skin surface and analyzing the polarimetry data from points corresponding to the skin surface of the patient scanned.

With reference to FIG. 16, four-dimensional point clouds 1400, 1402, 1404, 1406 generated by the LIDAR systems and methods of the present disclosure are shown for a scan of the skin surface of a patient. While only the X and Y axes of the XYZ coordinate system are shown in FIG. 16, it is understood that the point clouds 1400, 1402, 1404, 1406 are three dimensional with the Z axis being omitted for ease of illustration. The point clouds 1400, 1402, 1404, 1406 each include a plurality of points with each point representing a location on the skin surface of the patient. As further illustrated in FIG. 16, each XYZ point in the point clouds 1400, 1402, 1404, 1406 also includes associated material composition information. As shown by the key 1408, the points of the point cloud 1400 are indicated as having material composition corresponding to normal skin. The points of the point cloud 1402 are indicated as having material composition information corresponding to acne. The points of the point cloud 1404 are indicated as having material composition information corresponding to a tumor. The points of the point cloud 1406 are indicated as having material composition information corresponding to dry skin. The point clouds 1300, 1302, 1304 can be generated, for example, by a LIDAR system utilizing a materials database that stores information corresponding to material compositions of different skin conditions and diseases. Generally, the four-dimensional point clouds can be used to distinguish biological materials, cells, tissues, and the like, for example, locations of malignant cells versus benign cells or identities of select biological materials. In this way, the LIDAR systems and other methods of the present disclosure can be utilized for detection of a health status of a live object, such as an organism like an animal. The animal may be a human in certain aspects.

Similarly, the LIDAR systems and methods of the present disclosure can also be utilized for facial recognition.

In addition, the LIDAR systems and methods of the present disclosure can also be incorporated into other devices, such as a personal computer, laptop, portable device, smartphone, tablet device, etc. For example, the lasers used for the laser pulses can be implemented using diode lasers that can be included with other devices, such as a personal computer, portable device, smartphone, tablet device, etc. When incorporated into a smartphone, laptop, or tablet device, for example, the LIDAR systems and methods of the present disclosure, for example, can be used for facial recognition to allow access to the smartphone, laptop, or tablet device.

In addition, the LIDAR systems of the present disclosure can be used to communicate with other LIDAR systems. For example, the LIDAR systems can use the polarization of a transmitted laser pulse to communicate data. As an example, the LIDAR systems can be incorporated into a vehicle and when the vehicle is turning left, the LIDAR system can transmit left polarized pulses to a LIDAR system of a surrounding vehicle. Similarly, when the vehicle is turning right, the LIDAR system can transmit right polarized pulses to a LIDAR system of a surrounding vehicle. In addition, two LIDAR systems can transmit pulses having a specific sequence of polarizations to communicate information, such as verification information to confirm and validate the identity of each other and prevent the LIDAR systems from being impersonated or hacked by a third party. For example, a first LIDAR system can request that a second LIDAR system send verification information through a specific sequence of polarizations known to the two LIDAR systems.

The LIDAR systems and methods of the present disclosure can be used to generate information about scanned materials that is sensed acquired via the analysis of polarization of the reflected and scattered LIDARs beams. The material sensing LIDAR systems and methods of the present disclosure perform computational analysis of the polarization ratio between s-polarization and p-polarization from the modulated laser beam impinging upon scanned objects items. Concomitantly the Raman scattering and other information can be acquired that complements the polarization processing.

Polarization of the impinging LIDAR beam can be circularly polarized. The polarization of the reflected and scattered LIDAR beams can be analyzed in respect to circular polarization. Chirality of the material or its component or its shape will be the essential materials property that affects the polarization signature of the items being detected. Each XYZ data point obtained by the LIDAR is complemented by the another characteristic, such as materials detection characteristic, i.e. the polarization ratio or the data obtained from the comparison of the polarization ratio processed computationally in correspondence with the database containing different materials. Each XYZ point is provided with additional data such that the point becomes more than a three dimensional point. When the material attribute is included, the point becomes a four dimensional point. In the case of different Raman scattering or other attribute information simultaneously given to the data point, the point becomes multidimensional, having more than four dimensions.

As discussed above, materials information of each points can be assigned by deep learning neural network algorithms based on materials database. The materials database can be acquired by a polarimetry LIDAR setup. The beam of the LIDARs is modulated as linearly or circularly polarized. The polarimetry LIDARs measure polarization difference upon reflection/scatter by analyzing the s- and p-polarized light ratio of reflected/scattered light. The angular dependence of reflectance and scattering physics of each materials will be included in the database based on both measurement results and electric field computation. Color effect of each materials will be included in the database based on both measurement and electric field computation according to the CIE color vector space. The polarimetry Raman scattering and FTIR information can be acquired and included in the materials database. The optical activities of materials including linear dichroism and circular dichroism properties will be included in the material database. The materials database package will provide full understanding of materials without regard to texture, angle of incident, and coating color.

Multidimensional materials recognition LIDAR can also be realized by processing intensity profile for the reflected and scattered light. In this case the signal is processed by the machine learning algorithm that includes as one of the neural network layers the physics of reflection and assessment of the reflected light profile based on the expected materials parameters. Not only intensity maximum but also the decay of the intensity and noise frequencies are included as a parameters for training of such network.

In certain variations, the present disclosure provides a system comprising a polarization-enabled camera, also referred to as a polarimetric camera, configured to sense a polarization of the light it detects. In these variations, because the system utilizing a polarimetric camera detects the polarization of ambient light reflected off of an object, the system does not require the laser and beam steerer described in the above systems and methods. Instead, in these variations the system utilizes unpolarized ambient light and can detect the polarization of the ambient light that is reflected off of the object. The ambient electromagnetic radiation may include visible light, ultraviolet light, infrared light, and the like. Particularly suitable visible and infrared electromagnetic radiation includes, visible light having wavelengths ranging from about 390 to about 750 nm and infrared radiation (IR) (including near infrared (NIR) ranging from about 0.75 to about 1.4 μm and far infrared (FIR) ranging from about 15 μm to 1 mm). The far infrared (FIR) part of the electromagnetic spectrum, also known as terahertz (THz) diapason, has photon wavelengths from about 100 μm to about 1 mm and energies from about 0.001 eV to about 0.01 eV. Besides being informative for many areas of THz studies from astronomy and solid-state physics to telecommunication, THz circular dichroism (TCD) can be used in understanding and detecting astronomy, solid-state physics, telecommunication, biomaterials, biomolecules, and pharmaceuticals, by way of non-limiting example.

With reference to FIG. 1, for example, the system utilizing a polarimetric camera in accordance with these variations does not require a laser 102 and beam steerer 106 and does not require generation of beam 104 or beam 108. In other words, in systems utilizing the polarimetric camera, ambient light is utilized in place of beam 104 and beam 108 generated by laser 102.

In one aspect, similar to the above systems and methods, the sensed polarization information about the ambient light reflected off of the detected object is used by a processor to determine and sense at least one material of the detected object.

In other aspects, the systems and methods of the present disclosure may include both a LIDAR and a polarimetric camera in the same perception system. In a further aspect, the polarimetric camera is configured to sense polarization information about the ambient light reflected off of the detected object as well as polarization information about the laser from the LIDAR that is returned from the detected object.

In other aspects, the processor is configured to classify the object based on the detected at least one material of the object by applying a machine-learning algorithm. In a further aspect, the machine-learning algorithm comprises an artificial neural network algorithm.

In other aspects, the present disclosure provides polarimetric camera systems and methods configured to detect an object's relative distance or location and shape along with additional information about the object, such as polarization information about ambient light reflected off of the object and detected by the polarimetric camera system. The polarization information can be used to determine the material composition of the object, as described above with respect to the systems and methods that sense polarization information using a laser, beam steerer, and at least one polarizer. In this way, the additional information about the object and/or about the returned/reflected beams adds an additional dimension of information that is stored and associated with the distance or location and shape information about the object. In other words, the polarimetric camera systems and methods of the present disclosure are multidimensional in the sense that the systems and methods are configured to detect information in addition to the three-dimensional information representing an object's relative distance or location and shape. For example, the material composition of the object can add a fourth dimension to the information associated with the object. Additionally or alternatively, the additional information about the beam returned from the object may include polarization information and material composition information, and the like, which can add one or more additional dimensions to the information associated with the object.

For example, an object detected by the polarimetric camera systems and methods of the present disclosure can be represented by a point cloud in a three-dimensional XYZ coordinate system. The point cloud can include a plurality of points, with each point representing a location on the surface of the object and having associated XYZ coordinates. Similar to the above-described LIDAR systems, generating a point cloud with polarimetric camera systems and methods can include a process of repeatedly detecting ambient light reflecting off of the object, the reflected light being measured by the polarimetric camera, and determining the location of a point on the surface of the object. This process can then be repeated multiple times per second, such as on the order of millions of times per second, with a point being generated each time. The various points are then mapped onto the same XYZ coordinate system to create the point cloud.

For each point in the point cloud representing the object, the polarimetric camera systems and methods of the present disclosure can also determine a fourth dimension representing the composition of the material located at that particular point on the surface of the object. Additionally or alternatively, for each point in the point cloud representing the object, the polarimetric camera systems and methods of the present disclosure can also determine additional dimensions corresponding to the additional information about the returned (e.g., reflected) ambient light associated with that particular point on the surface of the object, such as optical characteristics about the reflected light. As noted above, the additional information can include, for example, polarization information, associated with that particular point on the surface of the object. In this way, the polarimetric camera systems and methods of the present disclosure can also determine a multidimensional point cloud representing a detected object that includes XYZ coordinates for points representing the surface of the object, with each point having, in addition to an XYZ coordinate, additional associated information, such as information representing the material composition of the surface of the object at that particular point and/or additional information about the reflected light from that particular point, such as polarization information. As discussed above, the material classification methods of the present disclosure can determine the material composition information from the optical information, e.g., polarization information, about the reflected light. In this way, the polarimetric camera systems and methods of the present disclosure can generate and store any combination of the material composition information and/or the additional optical information, e.g., polarization information, associated with each point in the point cloud representing the detected object.

With reference to FIGS. 17A-17C, a polarimetric camera 2000 is shown. Specifically, FIG. 17A shows a perspective view of the polarimetric camera 2000. FIG. 17B shows a front view of the polarimetric camera 2000 and FIG. 17C shows a back view of the polarimetric camera. The polarimetric camera 2000, for example, can be a Triton Polarization Model polarimetric camera available from Lucid Vision Labs, which utilizes Polarsense technology from Sony. The polarimetric camera 2000, for example, can record RGB polarized video at 24 frames per second (FPS) and 5.0 megapixel (MP) resolution. While the present disclosure describes systems and methods that utilize the Triton Polarization Model polarimetric camera, any other polarimetric camera that captures polarization information of light reflected off of an object can be used in accordance with the present disclosure.

Images captured by a standard photographic cameras contain RGB color data for each pixel in the image, but nothing further. With the polarimetric camera 2000, each pixel also stores data about the polarization of the detected light. When light reflects off of a surface of an object, before being sent to the lens of the polarimetric camera 2000, the light shifts in polarization based on properties of the material of that surface. Due to these unique polarization signatures, if two objects are comprised of different materials then the polarization of the reflected light off of each object will be different and the two objects be differentiable based on the different polarizations of the reflected light. A standard camera and image recognition algorithm, without polarization information, would have difficulty differentiating between the two objects. For example, a road with a layer of black ice will have a dramatically different polarization image than a road without black ice. A standard camera, however, would generate RGB images of the two roads that would look extremely similar, if not identical. Similarly a black rubber tire has a very different polarization profile than a black bag due to different texture and other properties of the constituent material. As such, the polarimetric camera systems and methods of the present disclosure are advantageously able to distinguish a black rubber tire from a black plastic bag and a road covered in black ice from a road that does not have black ice.

The polarimetric camera 2000 is configured to sense a polarization of ambient light reflected off of a detected object. Polarization is a property of all electromagnetic radiation, including the light which cameras measure in order to sense or detected objects in the surrounding environment. All light, even if initially completely unpolarized, will enter a new polarization state upon reflecting off of a surface of an object. This change in polarization is dependent upon, and corresponds to, the particular composition of material of the object off of which the light is being reflected, as well as the angle at which the light reflects off of the material of the object. The closer a ray of light is to being perpendicular to the reflecting surface, the more significant of a change this light's polarization value will experience. As such, the more distant an object is, the material-based effects of its surface on the light will get stronger. Although increased distance can make object detection more difficult due to decreased resolution, the relative strengthening of the light-to-surface interaction for distant objects provides some relief for this difficulty. The polarization information can be fed into the perception layer of the systems and methods of the present disclosure and is used to determine the material composition of sensed objects, even when the sensed objects are more distant and the resulting image of the object has lower resolution than a closer object. For example, the systems and methods of the present disclosure can access a materials database, such as materials data base 1216 shown in FIG. 14, to determine a material of an object, and/or a point on an object, based on a polarization of ambient light reflected off of the object and/or the point on the object.

A particular polarization state can be any angle between 0 and 360 degrees. In a similar manner, hue (a property of color) is often represented in a circular manner with each hue corresponding to a degree of rotation. Taking advantage of this fact, false-color photographs can be created which are representative of the sort of visual contrast afforded by the polarization data generated by polarimetric cameras 2000. For example, FIG. 18 shows an image 2050 of a group of objects illustrated without utilizing polarization data. The image 2050 was generated with a non-polarimetric camera. FIG. 18 also shows an image 2052 of the same group of objects generated by a polarimetric camera 2000 and illustrated using false-color polarization to show the additional contrast and feature visibility available with the use of the polarization data captured by the polarimetric camera 1000. By training a machine learning system, in accordance with the present disclosure, to take this polarization information into account in the same context as color, entirely new correlations can be formed which are stronger and more prevalent than anything that a standard camera vision system is capable of achieving.

With reference to FIG. 19, and similar to FIG. 6 discussed above, MST polarization analysis of reflected light was performed using AI data processing with a neural network algorithm to produce the confusion matrix of FIG. 19. Along the x-axis, predicted types of materials for a test object subjected to the processing methods described herein are identified. Along the y axis, the true types of materials for the test object are identified. The accuracy of various predictions of the AI algorithm for the various material types are shown at the intersections of the predicted material types and true material types. As shown, the materials detection functionality of the systems and methods of the present disclosure may be accomplished with a high degree of accuracy (including at or above 96% in one instance).

Additionally, there are many possible edge-case situations where an object can be essentially camouflaged due to its color, but is entirely visible to the polarimetric camera systems and methods of the present disclosure that use polarization information of the objects. For example, in an image of a child in a yellow rain coat standing in front of a yellow school bus, traditional systems may not be able to discern a different between the child and the school bus. A system using polarization information in accordance with the present disclosure, however, can recognize that the polarization of light reflected off of the material of the yellow rain coat is distinguishable from the polarization of the light reflected off of the material of the yellow school bus. As such, systems using polarimetric cameras 2000 in accordance with the present disclosure can distinguish between the two objects, classify the different materials and objects, and recognize the boundaries and edges between the two objects. As a result, for detecting distant or visually ambiguous objects, the systems and methods of the present disclosure provide a significant increase in a success rate of identifying materials and objects while also cutting down on the amount of time needed for classification, identification, etc.

Object detection and computer vision systems can divide an image into dozens or hundreds of objects represented therein. The object detection data can then be fed into object classification algorithms, which describe the identity of each identified object. Adding polarization information to the perception layer of object detection and computer vision systems, in accordance with the present disclosure, improves the ability of such systems to discriminate between objects and classify such objects with reduced processing time as compared with systems that do not utilize such polarization information.

In accordance with the present disclosure, the polarimetric camera 2000 can be used in place of the LIDAR, beam steerer, and at least one polarizer described in the above systems and methods.

For example, the polarimetric camera 2000 can be used to generate the four-dimensional point clouds shown in FIGS. 12, 15, and 16. In addition, the polarimetric camera 2000 can be used with the method 1100 of training a neural network used to identify material composition of objects, described above with reference to FIG. 13 by replacing the LIDAR system with a polarimetric camera system having the polarimetric camera 2000 and using the detected polarization information as the reflected optical information described above, for example, with respect to reference numeral 1106 of FIG. 13.

In addition, one or more polarimetric cameras 2000 can be used with the example recycling system 1200 described above with reference to FIG. 14. In each case, the described LIDAR, beam steerer, and at least one polarizer described above with respect to each of those systems and methods can be replaced by a polarimetric camera 2000 configured to capture polarization information of ambient light reflected off of the object. With reference to FIG. 1, the laser 102, beam steerer 106, s-polarization linear polarizer 114, p-polarization linear polarizer 116, s-polarization detector 122, and p-polarization detector 124 can be replaced with a polarimetric camera 2000 that detects the polarization of ambient light reflected off of the object 110.

With reference to FIG. 14, for example, one or more of the LIDAR systems 1214a, 1214b, 1214c can be replaced with one or more polarimetric cameras 2000. In such case, the control module 1218 is configured to access the materials database 1216 and determine a multidimensional point cloud for the object 1220, in accordance with the classification techniques described above, based on the polarization information of the ambient light reflected off of the object 1220 and sensed by the one or more polarimetric cameras 2000.

The multidimensional point cloud, for example, can include material classification information for each point of the point cloud representing the object 1220. As described above, based on the material classification information, the control module 1218 can then control the sorter 1206 to sort the object 1220 into the appropriate classification bin for recycling. In this way, the polarimetric camera systems and methods of the present disclosure can accurately determine the material composition of objects to be recycled and can be used in conjunction with a sorting system to appropriately and automatically sort objects to be recycled into recycling material groups.

Additionally, the polarimetric camera systems and methods of the present disclosure can be used in autonomous driving systems to sense objects in the vicinity of an autonomous vehicle and generate four dimensional point clouds for the objects to sense, categorize, and recognize the objects. For example, the polarimetric camera systems and methods of the present disclosure can be used to generate the four dimensional point cloud of a person riding a bicycle, as shown in FIG. 12.

Additionally, the polarimetric camera systems and methods of the present disclosure can be used in medical/cosmetic applications to identify, for example, areas of the skin that exhibit certain conditions and for diagnosis of skin diseases by mapping the skin surface an analyzing the polarization information from points corresponding to the skin surface of the patient scanned. For example, the polarimetric camera systems and methods of the present disclosure can be used to generate four-dimensional point clouds 1400, 1402, 1404, 1406 shown in FIG. 16. As described above, a materials database that stores information corresponding to material compositions of different skin conditions and diseases can be used to generate the four-dimensional point clouds, which can, in turn, be used to distinguish biological materials, cells, tissues, and the like. For example, locations of malignant cells versus benign cells or identities of select biological materials can be determined.

Similarly, the polarimetric camera systems and methods of the present disclosure can be utilized for detection of health status or a biological indicator of a live object, such as an organism. The organism may be an animal, such as a human.

The following table (Table 1) provides a comparison between different camera/sensor types, such as a standard camera, a hyperspectral camera, a polarimetric camera, a LIDAR system, and a Radar system in terms of (i) the unique wavelengths of light measured, (ii) whether material-relevant additional data is provided, (iii) the number of polarization angles, (iv) the current estimated price range, (v) the cycles per second, and (vi) the relative data processing requirement. (The relative data processing requirements for the LIDAR and Radar systems are not shown).

TABLE 1

Comparison of data streams from different cameras suitable for machine vision

| Camera Type → | Standard | Hyperspectral | Polarimetric | LIDAR | Radar |
|---|---|---|---|---|---|
| Unique wavelengths of light measured | 3 | 20 or more | 3 | 1 | 1 |
| Material-relevant additional data | No | Yes | Yes | No | No |
| Polarization Angles | 0 | 0 | 4 | 0 | 2 |
| Price Range (at scale) | $50-$500 | $2000-$20,000 | $750-$2500 | $500-$50,000 | $300-$800 |
| Cycles per second | 24 | 24 | 24 | ~10 | ~60 |

TABLE 1-continued

Comparison of data streams from different cameras suitable for machine vision

| Camera Type → | Standard | Hyperspectral | Polarimetric | LIDAR | Radar |
|---|---|---|---|---|---|
| Data Processing Requirement (relative) | 1 | 6-60 | 2-4 | N/A | N/A |

In other aspects, the systems and methods of the present disclosure can be used to classify and/or identify objects based on the different types of materials that comprise the object. For example, machine learning techniques and algorithms can be used to build an object database that includes correlation information that correlates a listing of particular objects with the particular materials that comprise each object. With reference to the four-dimensional point cloud shown in FIG. 12, for example, the object database may include a database entry for a bicyclist indicating that the bicyclist object is comprised of skin, cotton, aluminum, and rubber. In this way, when the systems and methods of the present disclosure sense an object comprised of skin, cotton, aluminum, and rubber, the object database can be queried based on the sensed materials. Based on the query, the systems and methods of the present disclosure can determine that, based on the material composition of the object, it is likely that the object is a bicyclist. Additionally, the object database can include percentages for each type of material, or a range of percentages for each type of material, indicating the approximate percentage or range of percentages that each type of material can be found in the particular object. In this way, the systems and methods of the present disclosure can utilize the material information to more accurately classify and identify objects. The identification and classification of objects can be used in conjunction with a computer vision system that identifies and classifies objects based on size, shape, and/or other characteristics of the object.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a polarimetric camera configured to receive ambient light reflected off of a surface of an object and to generate image data associated with the object and polarization data associated with the ambient light reflected off of the surface of the object;
    a processor configured to: generate a point cloud representing the object based on the image data and the polarization data, the point cloud having a plurality of points, each point having a three-dimensional positional coordinate representing a location of the point on the object and material information indicating a material of the object at the location of the point on the object; determine the material information based on a polarization of the ambient light reflected off of the object from the location of the point on the object; and to access a materials database that stores correlation information between ambient light polarization and object materials and determines the material information indicating the material of the object at the location of each point on the object based on the materials database and based on the polarization of the ambient light reflected off of the object from the location of each point on the object.

2. The system of claim 1, wherein the processor is further configured to determine a plurality of materials that comprise the object based on the material information indicating the material of the object at the location of each point on the object and to perform at least one of classifying or identifying the object based on the plurality of materials that comprise the object.

3. The system of claim 2, wherein the processor is further configured to access an object database that stores correlation information between a plurality of objects and materials that comprise each object of the plurality of objects and to perform the at least one of classifying or identifying the objects based on the correlation information stored in the object database and the plurality of materials that comprise the object.

4. The system of claim 1, wherein the processor is further configured to determine an edge within the image data between the object and an additional object detected by the polarimetric camera based on a difference between the polarization data associated with the ambient light reflected off of the surface of the object and additional polarization data associated with the ambient light reflected off of a surface of the additional object.

5. The system of claim 1, wherein the object is one of a plurality of objects, the system further comprising:
    a conveyor belt configured to transport the plurality of objects past the polarimetric camera; and
    a sorter that sorts the plurality of objects into a plurality of containers;
    wherein the processor is configured to control the sorter to sort the object into a one of the plurality of containers based on the material information.

6. The system of claim 1, further comprising:
    at least one additional polarimetric camera located at a different location from the polarimetric camera and configured to generate additional image data and additional polarization data associated with the object;
    wherein the processor is configured to generate the point cloud representing the object additionally based on the additional image data and additional polarization data generated by the at least one additional polarimetric camera.

7. The system of claim 1, wherein the object is a live object and the processor is further configured to determine a health status of the live object based on the material information of the plurality of points of the point cloud.

8. The system of claim 1, wherein the polarimetric camera is further configured to receive laser light generated by a laser device and reflected off of the surface of the object, to generate additional polarization data associated with the laser light reflected off of the surface of the object, and to determine the material information additionally based on a polarization of the laser light reflected off of the object from the location of the point on the object.

9. The system of claim 8, wherein the laser device generates laser light in a far infrared part of an electromagnetic spectrum.

* * * * *